United States Patent
Oki et al.

(10) Patent No.: US 9,257,915 B2
(45) Date of Patent: Feb. 9, 2016

(54) BRIDGE RECTIFIER CIRCUIT

(71) Applicant: SOCIONEXT INC., Yokohama-shi, Kanagawa (JP)

(72) Inventors: Hideta Oki, Kawasaki (JP); Yukinori Maekawa, Kasugai (JP)

(73) Assignee: SOCIONEXT INC., Yokohama (JP)

( * ) Notice: Subject to any disclaimer, the term of this patent is extended or adjusted under 35 U.S.C. 154(b) by 0 days.

(21) Appl. No.: 13/973,661

(22) Filed: Aug. 22, 2013

(65) Prior Publication Data
US 2014/0098582 A1     Apr. 10, 2014

(30) Foreign Application Priority Data

Oct. 5, 2012     (JP) .................. 2012-223296

(51) Int. Cl.
*H02M 7/219*     (2006.01)
*H02M 7/06*     (2006.01)
*H02M 7/217*     (2006.01)

(52) U.S. Cl.
CPC ............... *H02M 7/219* (2013.01); *H02M 7/06* (2013.01); *H02M 7/217* (2013.01)

(58) Field of Classification Search
CPC ......... H02M 7/08; H02M 7/23; H02M 7/066; H02M 7/219; H02M 2001/0048
USPC ................................................ 363/125, 126
See application file for complete search history.

(56) References Cited

U.S. PATENT DOCUMENTS

| | | | | |
|---|---|---|---|---|
| 4,665,413 | A * | 5/1987 | Calviello | 257/476 |
| 5,375,028 | A * | 12/1994 | Fukunaga | 361/93.7 |
| 7,517,742 | B2 * | 4/2009 | Min et al. | 438/155 |
| 2008/0151673 | A1 * | 6/2008 | Fallah et al. | 365/226 |
| 2009/0168278 | A1 * | 7/2009 | Landry | 361/56 |
| 2009/0257259 | A1 * | 10/2009 | Leibovitz | 363/89 |
| 2010/0079034 | A1 * | 4/2010 | Ramadass et al. | 310/339 |
| 2011/0044035 | A1 * | 2/2011 | Chen et al. | 362/227 |
| 2011/0210788 | A1 | 9/2011 | Ashida | |

FOREIGN PATENT DOCUMENTS

| | | |
|---|---|---|
| JP | 06-295591 A | 10/1994 |
| JP | 2011-182191 A | 9/2011 |

* cited by examiner

*Primary Examiner* — Timothy J Dole
*Assistant Examiner* — Alan Stewart
(74) *Attorney, Agent, or Firm* — Arent Fox LLP

(57) ABSTRACT

A bridge rectifier circuit has first to fourth diode groups which are bridge-connected and each include a main diode and sub-diodes being enabled to be respectively connected in parallel to the main diode, first and second input terminals to which AC power is supplied, a first output terminal connected to the first input terminal via the first diode group and connected to the second input terminal via the second diode group, a second output terminal connected to the first input terminal via the third diode group and connected to the second input terminal via the fourth diode group, and a control circuit configured to detect a current flowing through at least one diode group and increases the number of sub-diodes connected in parallel to the main diode of the diode group through which the detected current flows in accordance with an increase in the detected current.

14 Claims, 19 Drawing Sheets

FIG. 7

| /S1, /S2 | R | /Q |
|---|---|---|
| A | 0 | 0 | 0 |
| B | 0 | 1 | 1 |
| C | 1 | 0 | RETAIN |
| D | 1 | 1 | 1 (RESET-DOMINANT) |

BRIDGE RECTIFIER CIRCUIT

CROSS-REFERENCE TO RELATED APPLICATION

This application is based upon and claims the benefit of priority of the prior Japanese Patent Application No. 2012-223296, filed on Oct. 5, 2012, the entire contents of which are incorporated herein by reference.

FIELD

The present invention relates to a bridge rectifier circuit.

BACKGROUND

Energy harvesting which is currently attracting attention is technology in which surrounding microenergy that is unused and discarded is collected from light, heat, vibrations, electromagnetic waves, and the like to generate power. Examples of energy harvesting include vibration power generation in which power is generated by subjecting a piezoelectric device to distortion and radio-frequency power generation in which ambient radio waves are converted into power by an antenna. Normally, electrical energy created by vibration power generation or radio-frequency power generation is supplied to a load circuit using an AC-DC converter which generates a DC output voltage with a desired potential from AC power created by power generation.

An AC-DC converter includes a rectifier circuit, a DC-DC converter, and the like, and first rectifies AC voltage of the AC power to a DC voltage with the rectifier circuit and then generates an output voltage with a desired potential from the DC voltage with the DC-DC converter.

A bridge rectifier circuit using a plurality of diodes is known as the rectifier circuit included in the AC-DC converter. When designing a bridge rectifier circuit, generally, a size of diodes used in the bridge rectifier circuit is determined based on a density of a current that can be passed through the diodes which is, in turn, determined by a material of the diodes, and on a maximum current value of a current that is desirably passed through the diodes.

A combination of diodes and switches are disclosed in Japanese Patent Application Laid-open No. 2011-182191 and Japanese Patent Application Laid-open No. H6-295591

SUMMARY

However, when a diode is formed on a semiconductor substrate, a leakage current is generated which leaks from an N-well region in which the diode is formed to a P-substrate. The leakage current increases mainly in proportion to an area of a P-N junction of the diode. Therefore, when the density of a current that can be passed through the diode is constant, the higher the maximum current value that is desirably passed through the diode, the greater the size of the diode and the greater the leakage current.

In addition, energy obtained by energy harvesting fluctuates according to external environment conditions and a current that flows through diodes of a rectifier circuit also fluctuates. Therefore, when a weak current generated by energy harvesting flows through a diode with a large size based on the maximum current value, a ratio of the leakage current to a current which flows through the diode and which is created by energy harvesting increases. In particular, in an environment where microenergy is generated over a long period of time, a large ratio of leaking unused energy among the generated microenergy is undesirable.

An aspect of the embodiment is a bridge rectifier circuit having: first, second, third, and fourth diode groups which are bridge-connected and which each include a main diode and a single or a plurality of sub-diodes that are enabled to be respectively connected in parallel to the main diode via a switch; first and second input terminals to which AC power from an AC power source is supplied; a first output terminal which is connected to the first input terminal via the first diode group and which is connected to the second input terminal via the second diode group; a second output terminal which is connected to the first input terminal via the third diode group and which is connected to the second input terminal via the fourth diode group; and a control circuit configured to detect a current flowing through at least one diode group from among the first, second, third, and fourth diode groups and to control, based on the detected current, the switch of the diode group through which the detected current flows, wherein the control circuit increases the number of sub-diodes connected in parallel to the main diode of the diode group through which the detected current flows in accordance with an increase in the detected current.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a truth table of the flip-flops F1 and F2 according to the first embodiment.

DESCRIPTION OF EMBODIMENTS

Hereinafter, embodiments of the present invention will be described with reference to the drawings.

Figure 1:
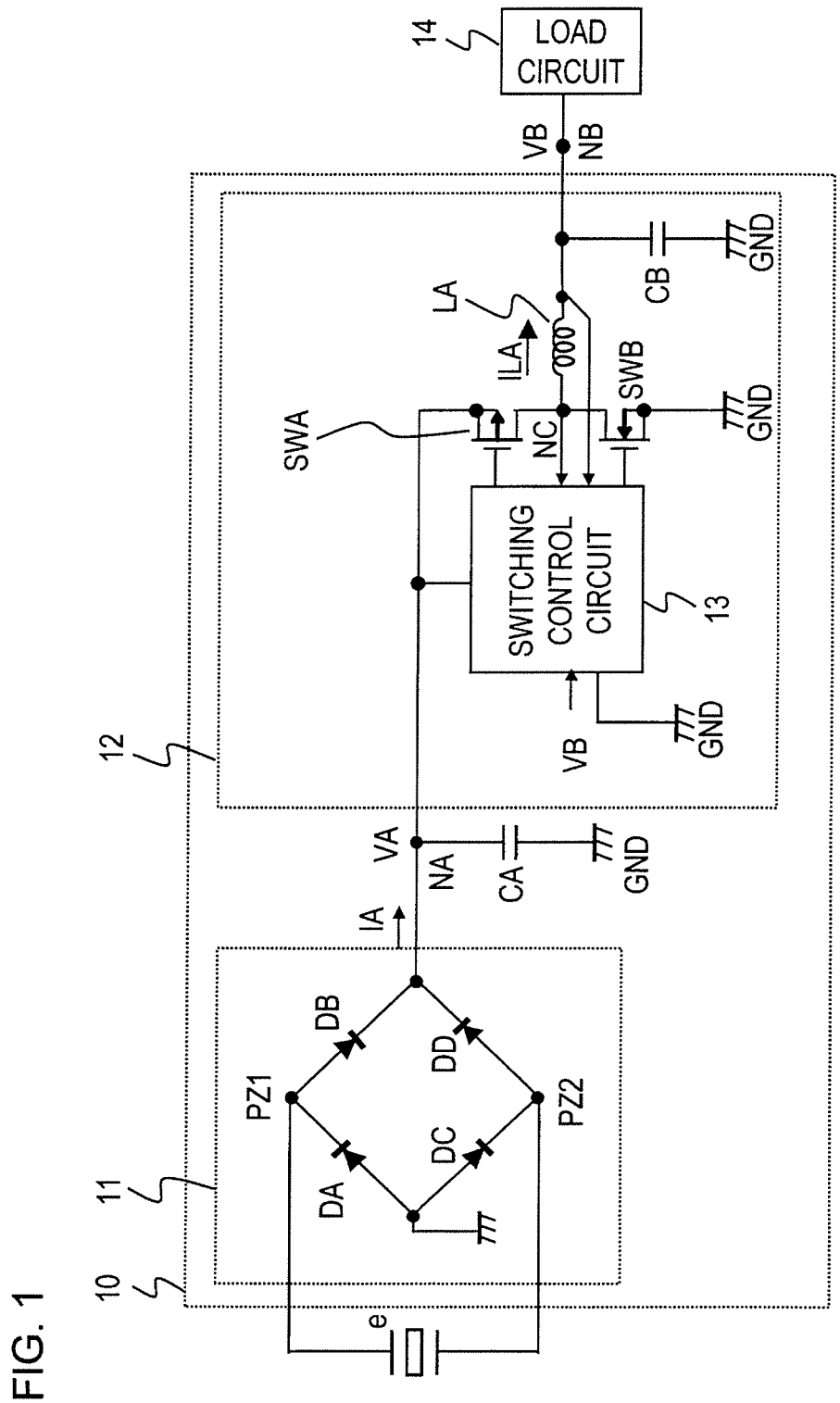
FIG. 1 is a diagram illustrating an example of an AC-DC converter.

FIG. 1 is a diagram illustrating an example of an AC-DC converter. An AC-DC converter 10 illustrated in FIG. 1 includes a bridge rectifier circuit 11 using four diodes DA, DB, DC, and DD which are connected to an AC power source e and which convert an AC current from the AC power source e into a DC current IA, a capacitor CA which is connected to a terminal NA, and a DC-DC converter 12 which generates a desired voltage VB at a terminal NB from a voltage VA of the terminal NA, and generates the desired voltage VB from energy generated by the AC power source e and supplies the desired voltage VB to the load circuit 14.

A unit for energy harvesting such as vibration power generation and wireless charging is used as the AC power source e. For example, when a piezoelectric device is used as the AC power source e, vibrational energy applied to a piezoelectric body is converted into electrical energy and an AC voltage is generated at nodes PZ1 and PZ2. The vibrational energy applied to the piezoelectric body fluctuates according to a usage environment of the AC power source e. For example, in an environment where a vibration of a motor is applied to the piezoelectric body of the AC power source e, electrical energy generated by the AC power source e fluctuates according to how the motor vibrates in the case of a constant high-speed vibration or an intermittent vibration.

The DC-DC converter 12 includes switches SWA and SWB that are connected in series between the terminal NA and ground GND, an inductor LA that is connected between a connection node NC of the switches SWA and SWB and the terminal NB, a capacitor CB that is connected to the terminal NB, and a switching control circuit 13 that controls the switches SWA and SWB.

When vibrational energy is applied to the AC power source e and energy harvesting is performed, an AC current is converted into a DC current IA by the bridge rectifier circuit 11. The DC current IA is then inputted to the terminal NA, an electrical charge is charged to the capacitor CA, and the voltage VA of the terminal NA increases. The switching control circuit 13 is not activated and the desired voltage VB is not outputted to the terminal NB until the voltage VA of the terminal NA reaches a predetermined voltage V0.

Once the voltage VA of the terminal NA reaches the predetermined voltage V0, the switching control circuit 13 turns on the switch SWA and turns off the switch SWB. Accordingly, the connection node NC rises to a same voltage VA as the terminal NA and an inductor current ILA gradually increases. Due to the inductor current ILA, the electrical charge charged to the input-side capacitor CA is transferred to the output-side capacitor CB.

After the lapse of a predetermined period of time, the switching control circuit 13 turns off the switch SWA and turns on the switch SWB. Accordingly, the connection node NC drops to a voltage that is lower than the ground voltage, the inductor LA continues passing the inductor current ILA in a forward direction due to accumulated electromagnetic energy, and charging of the capacitor CB is continued. However, the inductor current ILA decreases gradually. When the inductor current ILA assumes zero, the switching control circuit 13 turns off the switch SWB to prevent the inductor current ILA from flowing in a reverse direction.

As described above, due to the switching control circuit 13 controlling on and off states of the switches SWA and SWB, the electrical charge of the capacitor CA is charged to the capacitor CB and the voltage VA of the terminal NA drops. Therefore, the switching control circuit 13 turns off the switches SWA and SWB and suspends control of the switches SWA and SWB.

On the other hand, the dropped voltage VA of the terminal NA once again rises as an electrical charge continues to be charged to the capacitor CA by the AC power source e during the suspension of control of the switches SWA and SWB. In addition, when the voltage VA once again reaches the predetermined voltage V0, the switching control circuit 13 turns on the switch SWA and turns off the switch SWB for a predetermined period of time and subsequently turns off the switch SWA and turns on the switch SWB to charge an electrical charge to the capacitor CB.

As described above, due to the switching control circuit 13 repetitively controlling the switches SWA and SWB when the voltage VA of the terminal NA is equal to or higher than a predetermined voltage V0, the electrical charge is charged to the capacitor CB and the output voltage VB with a desired potential is generated at the terminal NB.

Figure 2:
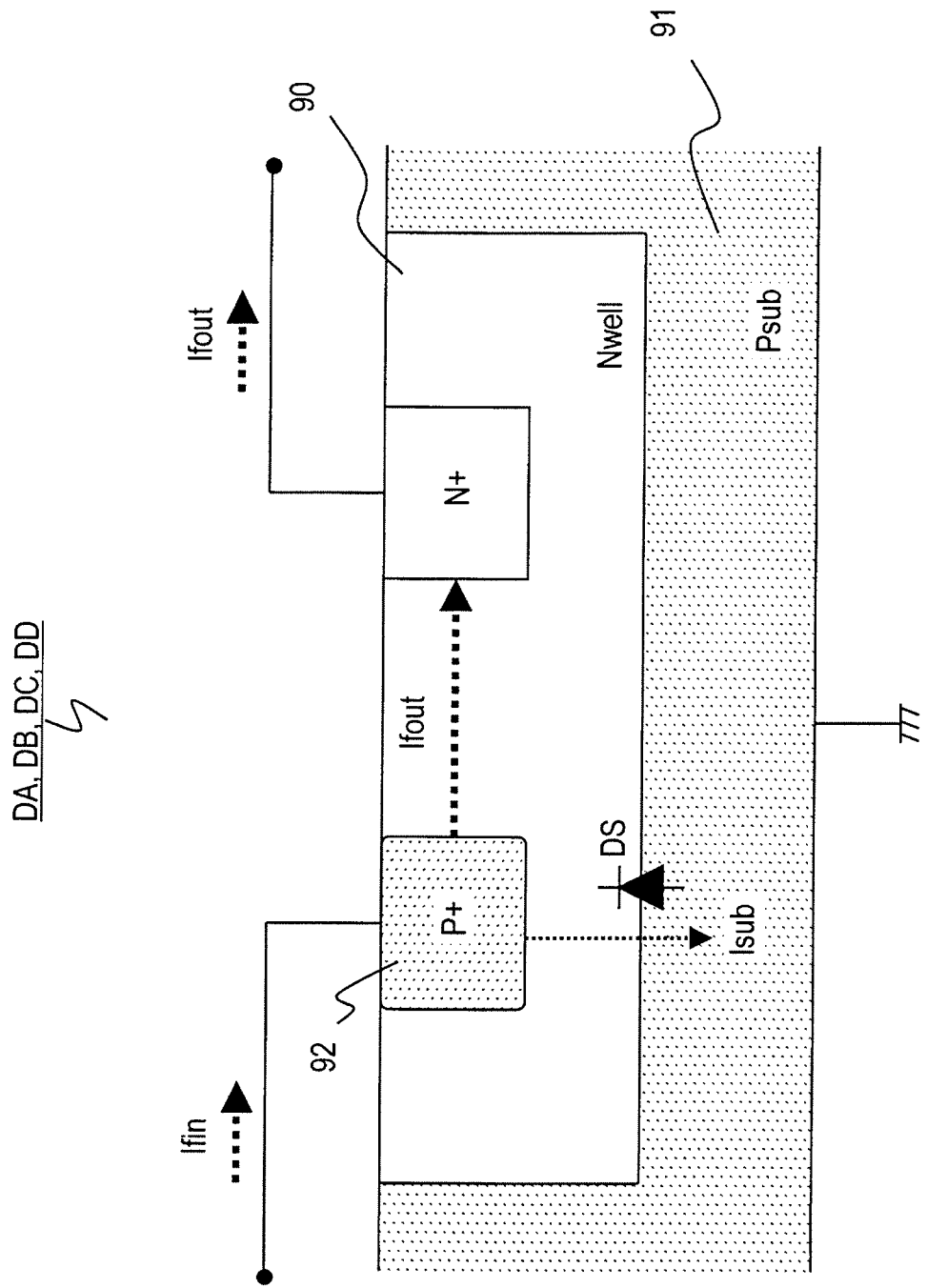
FIG. 2 is a diagram illustrating an example of a diode formed on a semiconductor substrate.

FIG. 2 is a diagram illustrating an example of a diode formed on a semiconductor substrate. When the diodes DA to DD used in the bridge rectifier circuit 11 of the AC-DC converter 10 illustrated in FIG. 1 is formed on a semiconductor substrate as illustrated in FIG. 2, a parasitic diode DS exists between an N-well region 90 and a P-substrate 91. During an operation of the bridge rectifier circuit 11, the parasitic diode DC enters an inversely-biased state and a reverse-direction leakage current Isub flows. Normally, since a leakage current increases mainly in proportion to an area of a P-N junction between the N-well region 90 and a P+ layer 92 above the N-well region 90, the greater the size of the diode, the greater the leakage current Isub.

When designing a bridge rectifier circuit, a size of a diode is determined based on a density of a current that can be passed through the diode which is, in turn, determined by a semiconductor material, and on a maximum current value of a current that is desirably passed through the diode. In addition, a constant leakage current Isub is created at a diode with a determined size.

With energy harvesting such as that performed by the AC power source e illustrated in FIG. 1, since generated electrical energy fluctuates according to external environmental conditions, an input current Ifin of a diode fluctuates. Therefore, with the bridge rectifier circuit 11 illustrated in FIG. 1, while the input current Ifin that is inputted to a diode fluctuates, on the other hand, a leakage current Isub created at the diode is a constant current that depends on the diode size designed based on a maximum current value of a current that is desirably passed through the diode. Therefore, the smaller the input current Ifin, the greater the ratio of the leakage current Isub to the input current Ifin.

Normally, since energy generated by energy harvesting is weak, it is desirable that the generated energy is fully utilized. In consideration thereof, a bridge rectifier circuit which suppresses leakage current and improves power generation efficiency will be described below.

First Embodiment

Figure 3:
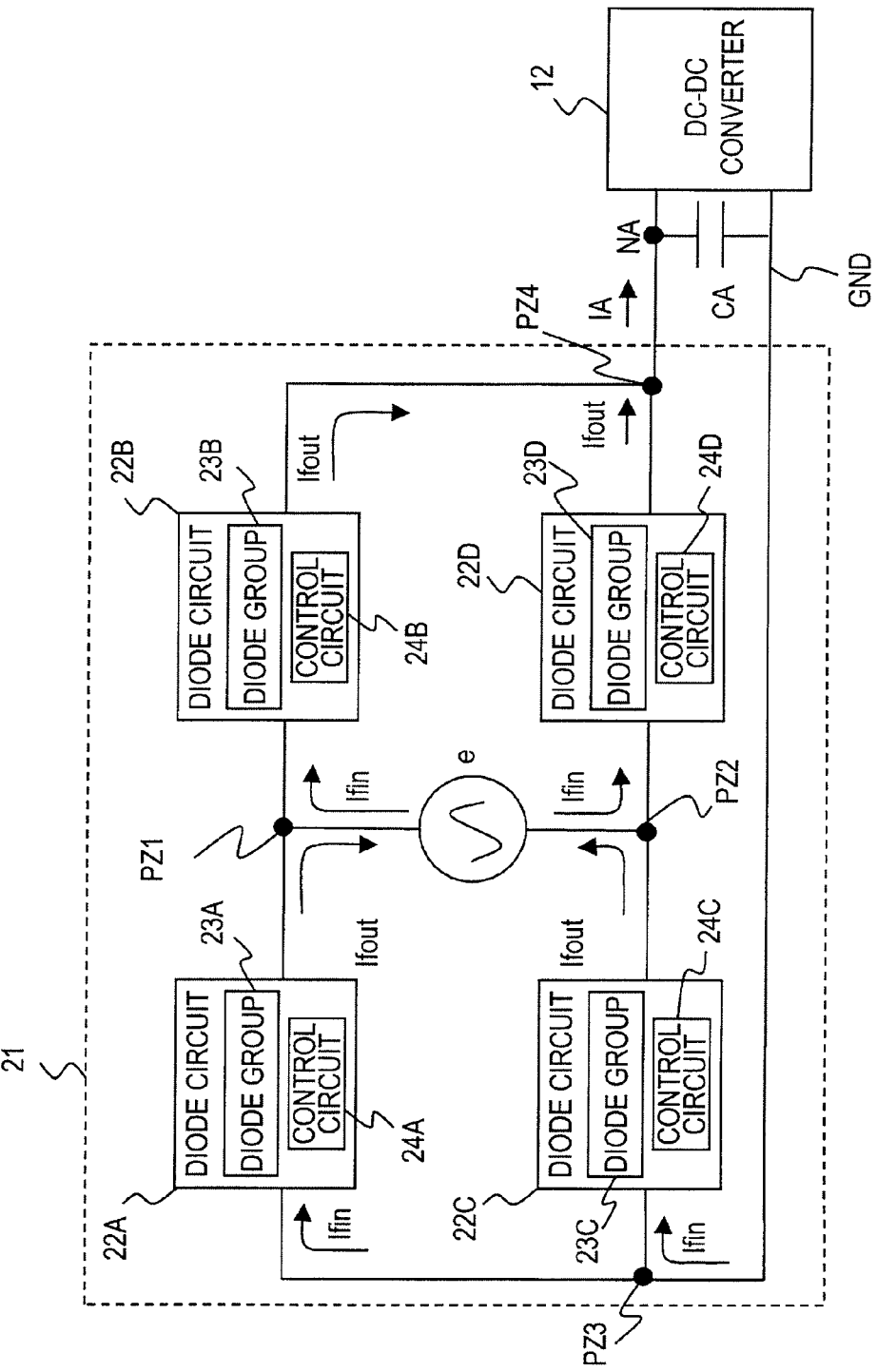
FIG. 3 is a diagram illustrating a first bridge rectifier circuit according to a first embodiment.

FIG. 3 is a diagram illustrating a first bridge rectifier circuit according to a first embodiment. A bridge rectifier circuit 21 illustrated in FIG. 3 is a bridge rectifier circuit in which diode circuits 22A to 22D are bridge-connected in place of the diodes DA to DD included in the bridge rectifier circuit 11 illustrated in FIG. 1. Moreover, as will be described later, the diode circuits 22A to 22D include diode groups 23A to 23D which have a plurality of diodes and control circuits 24A to 24D which detect currents of the diode groups and control a total size of the diodes.

In FIG. 3, an input current Ifin that is an AC current outputted from the AC power source e flows in either a first rectification direction in an order of "AC power source e→input terminal PZ1→diode circuit 22B→output terminal PZ4→capacitor CA→reference voltage GND→output terminal PZ3→diode circuit 22C→input terminal PZ2→AC power source e" or a second rectification direction in an order of "AC power source e→input terminal PZ2→diode circuit 22D→output terminal PZ4→capacitor CA→reference voltage GND→output terminal PZ3→diode circuit 22A→input terminal PZ1→AC power source e". Subsequently, the input current Ifin is rectified by the diodes included in each of the diode circuits 22A to 22D and converted into a DC current IA.

In FIG. 3, the diode circuits 22A to 22D (to be described later) each control sizes of diodes in their own diode groups based on the input current Ifin that is inputted to the diode groups using their own control circuits in order to control the leakage current Isub.

For example, when the input current Ifin is a weak current that is lower than a maximum current value, the diode circuits 22A to 22D reduce the sizes of diodes in their own diode groups to suppress the leakage current Isub. In addition, when generated energy of the AC power source e increases and the input current Ifin increases, the diode circuits 22A to 22D increase the sizes of diodes in their own diode groups to ensure that the leakage current Ifin flows without breaking the diodes.

Figure 4:
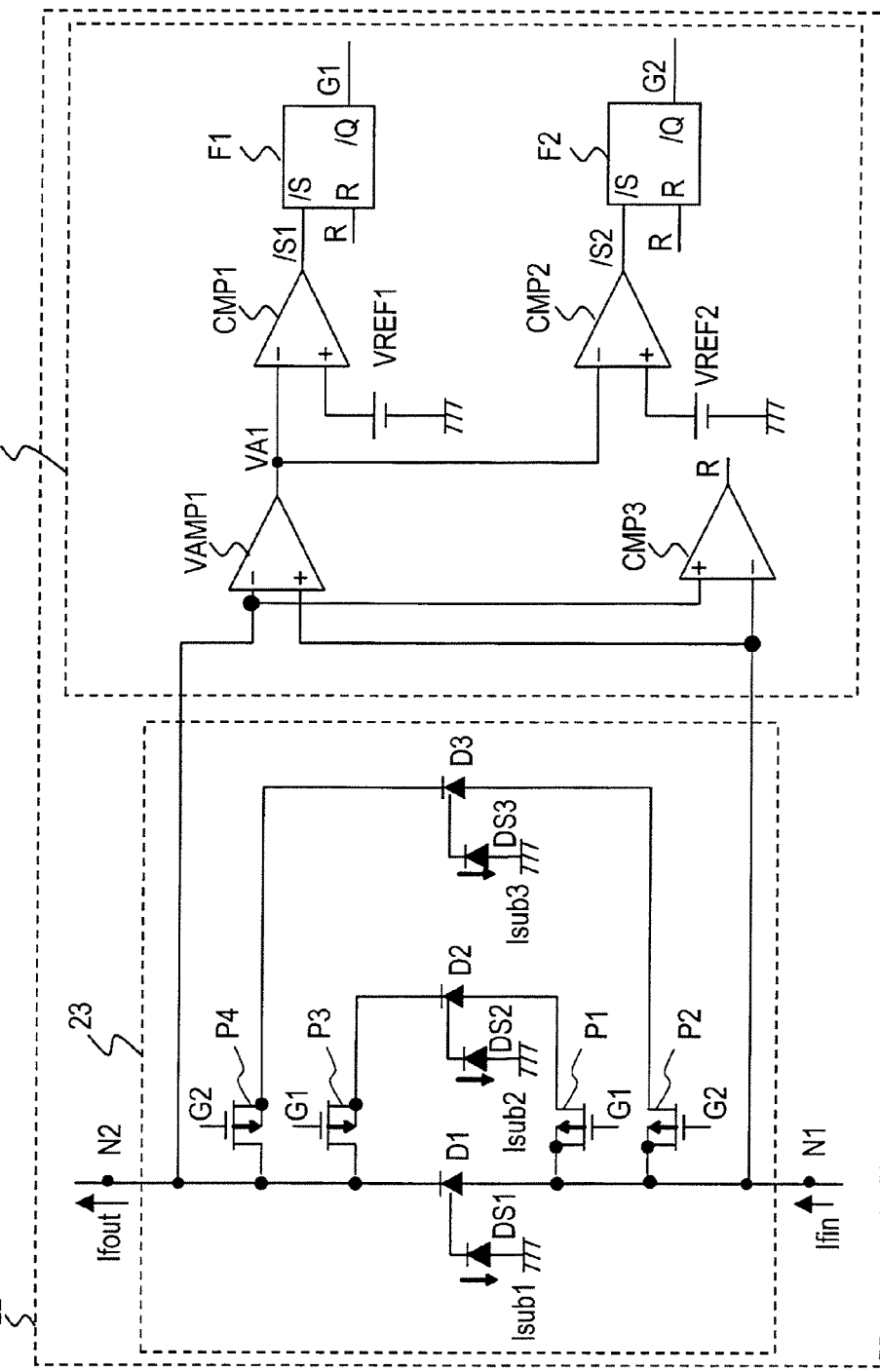
FIG. 4 is a diagram illustrating a first diode circuit according to a first embodiment.

FIG. 4 is a diagram illustrating a first diode circuit according to a first embodiment. A diode circuit 22 illustrated in FIG. 4 represents a configuration of the diode circuits 22A to 22D illustrated in FIG. 3. A diode group 23 represents a configuration of the diode groups 23A to 23D illustrated in FIG. 3. A control circuit 24 represents a configuration of the control circuits 24A to 24D illustrated in FIG. 3.

The diode circuit 22 includes the diode group 23 having, positioned between an input terminal N1 and an output terminal N2, a main diode D1 and a single or a plurality of sub-diodes that are controlled to be connected in parallel via a PMOS transistor (switch), and the control circuit 24 that detects an input current Ifin of the diode group 23 and controls the number of sub-diodes. FIG. 4 illustrates an exemplary configuration of the diode circuit 22 in which the diode group 23 has two sub-diodes D2 and D3. The diode group 23 has a similar configuration as that illustrated in FIG. 4 even when there is a single sub-diode or three or more sub-diodes.

The sub-diode D2 is connected to the input terminal N1 via a PMOS transistor P1 and to the output terminal N2 via a PMOS transistor P3. In a similar manner, the sub-diode D3 is connected to the input terminal N1 via a PMOS transistor P2 and to the output terminal N2 via a PMOS transistor P4.

The diodes D1, D2, and D3 respectively have parasitic diodes DS1, DS2, and DS3. When a current flows in a forward direction of the diodes D1, D2, and D3, the parasitic diodes DS1, DS2, and DS3 enter an inversely-biased state and reverse-direction leakage currents Isub1, Isub2, and Isub3 respectively flow through the parasitic diodes DS1, DS2, and DS3.

In the control circuit 24, an amplifier VAMP1 amplifies a potential difference Vf between the input terminal N1 and the output terminal N2 and produces an output VA1. A comparator CMP3 compares a voltage of the input terminal N1 with a voltage of the output terminal N2 and outputs an output signal R. A comparator CMP1 compares the output VA1 of the amplifier VAMP1 with a reference voltage VREF1 and outputs a comparison result /S1 to a flip-flop F1. A comparator CMP2 compares the output VA1 of the amplifier VAMP1 with a reference voltage VREF2 that is higher than the reference voltage VREF1 and outputs a comparison result /S2 to a flip-flop F2. The flip-flop F1 is a reset-dominant RS flip-flop which receives input of the output /S1 of the comparator CMP1 and the output R of the comparator CMP3 and which outputs a drive signal G1 to gates of the PMOS transistors P1 and P3 of the diode group 23. The flip-flop F2 is a reset-dominant RS flip-flop which receives input of the output /S2 of the comparator CMP2 and the output R of the comparator CMP3 and which outputs a drive signal G2 to gates of the PMOS transistors P2 and P4.

In other words, at the control circuit 24, when the input current Ifin increases, a forward potential difference Vf of the diodes rises and the output VA1 of the amplifier VAMP1 also increases. Therefore, the comparators CMP1 and CMP2 output comparison results /S1 and /S2 in accordance with the input current Ifin. As a result, the outputs G1 and G2 of the flip-flops F1 and F2 becomes low level subsequently in accordance with an increase of the input current Ifin.

Accordingly, when the input current Ifin is small, the control circuit 24 controls on-states or off-states of the PMOS transistors P1 to P4 so as to reduce the total size of the diodes, i.e. the number of the diodes, in the diode group 23. In addition, when the input current Ifin is large, the control circuit 24 controls on-states or off-states of the PMOS transistors P1 to P4 so as to increase the total size of the diodes in the diode group 23.

Next, specific operations of the diode circuit 22 illustrated in FIG. 4 will be described with reference to FIGS. 5 to 7.

Figure 5:
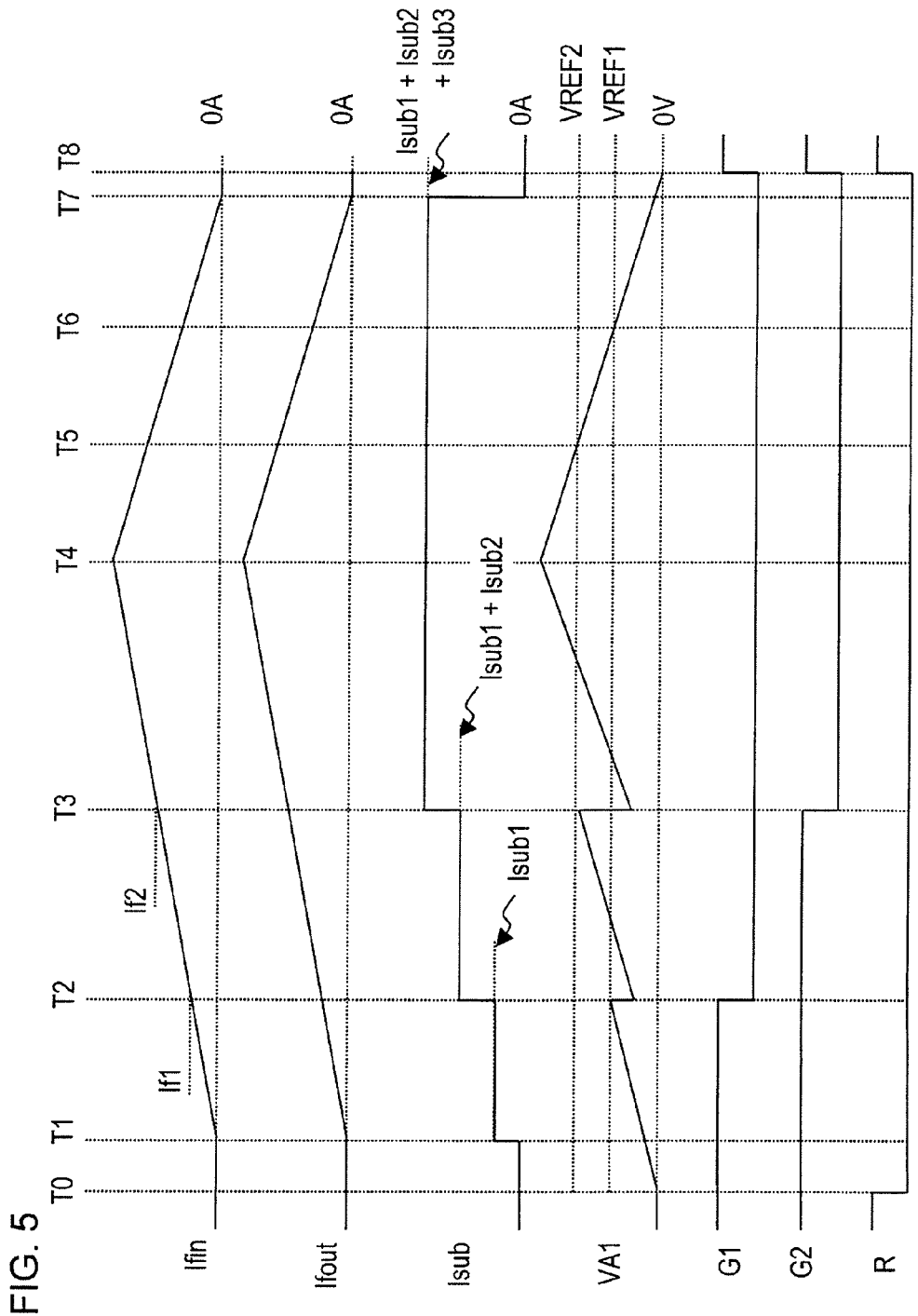
FIG. 5 is a timing diagram of the first diode circuit according to the first embodiment.

FIG. 5 is a timing diagram of the first diode circuit according to the first embodiment. FIG. 6 is a diagram illustrating a potential difference between input and output terminals of a diode group and an input current of the diode group corresponding to the potential difference according to the first embodiment. FIG. 7 presents a truth table of the flip-flops F1 and F2 according to the first embodiment.

Returning to FIG. 5, until time T0, energy harvesting is not performed by the AC power source e, the potential difference Vf between the input terminal N1 and the output terminal N2 of the diode group 23 is zero volts (0 V), and the input current Ifin is zero amperes (0 A).

At this point, the output R of the comparator CMP3 assumes an H level (a high-potential supply voltage; for example, a voltage VA). In addition, since the output of the amplifier VAMP1 assumes zero volts (0 V), the outputs /S1 and /S2 of the comparators CMP1 and CMP2 both assume an H level. As a result, drive signals G1 and G2 that are respectively outputted from the flip-flops F1 and F2 both assume an H level (a record D in FIG. 7). In addition, an H level is supplied to the respective gates of the PMOS transistors P1 to P4 of the diode group 23 and the PMOS transistors P1 to P4 all enter an off-state. Therefore, when the potential difference Vf is zero volts (0 V), a diode size of the diode group 23 assumes a size of the main diode D1.

Subsequently, the AC power source e starts energy harvesting at time T0 and the potential difference Vf between the input terminal N1 and the output terminal N2 rises. However, since the potential difference Vf is lower than a forward voltage Vf0 where the diodes enter an on-state, the input current Ifin is zero amperes (0 A) (A in FIG. 6).

At this point, since the output VA1 of the amplifier VAMP1 is lower than the reference voltage VREF1, the outputs /S1 and /S2 of the comparators CMP1 and CMP2 both remain at the H level. In addition, since the input terminal N1 has a higher potential than the output terminal N2, the output of the comparator CMP3 assumes an L level (a low-potential supply voltage; for example, 0 V). As a result, the drive signals G1 and G2 that are respectively outputted from the flip-flops F1 and F2 both remain at the H level that is a state prior to time T0 (a record C in FIG. 7). Therefore, the PMOS transistors P1 to P4 of the diode group 23 remain in an off-state. In other words, the size of diode group 23 remains at the size of the main diode D1.

When the potential difference Vf reaches the forward voltage Vf0 of the main diode D1 at time T1, an input current If0 flows through the diode group 23. In addition, subsequent to time T1, the input current If0 increases as the potential difference Vf rises (B in FIG. 6). Furthermore, the output VA1 of the amplifier VAMP1 also rises.

When the input current Ifin flows through the main diode D1, since the parasitic diode DS1 enters an inversely-biased state, a leakage current Isub1 is created. Therefore, an output current Ifout of the diode group 23 assumes a current obtained by subtracting the leakage current Isub=Isub1 from the input current Ifin. Moreover, since the leakage current Isub=Isub1 is weak with respect to the input current Ifin, the output current Ifout is illustrated in FIG. 5 so as to increase in a similar manner to the input current Ifin.

At time T2, when the output VA1 of the amplifier VAMP1 reaches the reference voltage VREF1 (when Ifin=If1 and Vf=Vf1 in FIG. 6), the output /S1 of the comparator CMP1 changes from the H level to the L level. As a result, the drive signal G1 that is outputted from the flip-flop F1 changes from the H level to the L level (a record A in FIG. 7).

Accordingly, the PMOS transistors P1 and P3 of the diode group 23 are switched from an off-state to an on-state and the main diode D1 and the sub-diode D2 are connected in parallel. At the same time, as illustrated in FIG. 6, the potential difference Vf between the input terminal N1 and the output terminal N2 drops from Vf1 to Vf1' and the output VA1 of the amplifier VAMP1 also drops.

In this manner, the size of the diode group 23 is enlarged from the size of the main diode D1 to a size (D1+D2) that combines the main diode D1 and the sub-diode D2.

Figure 6:
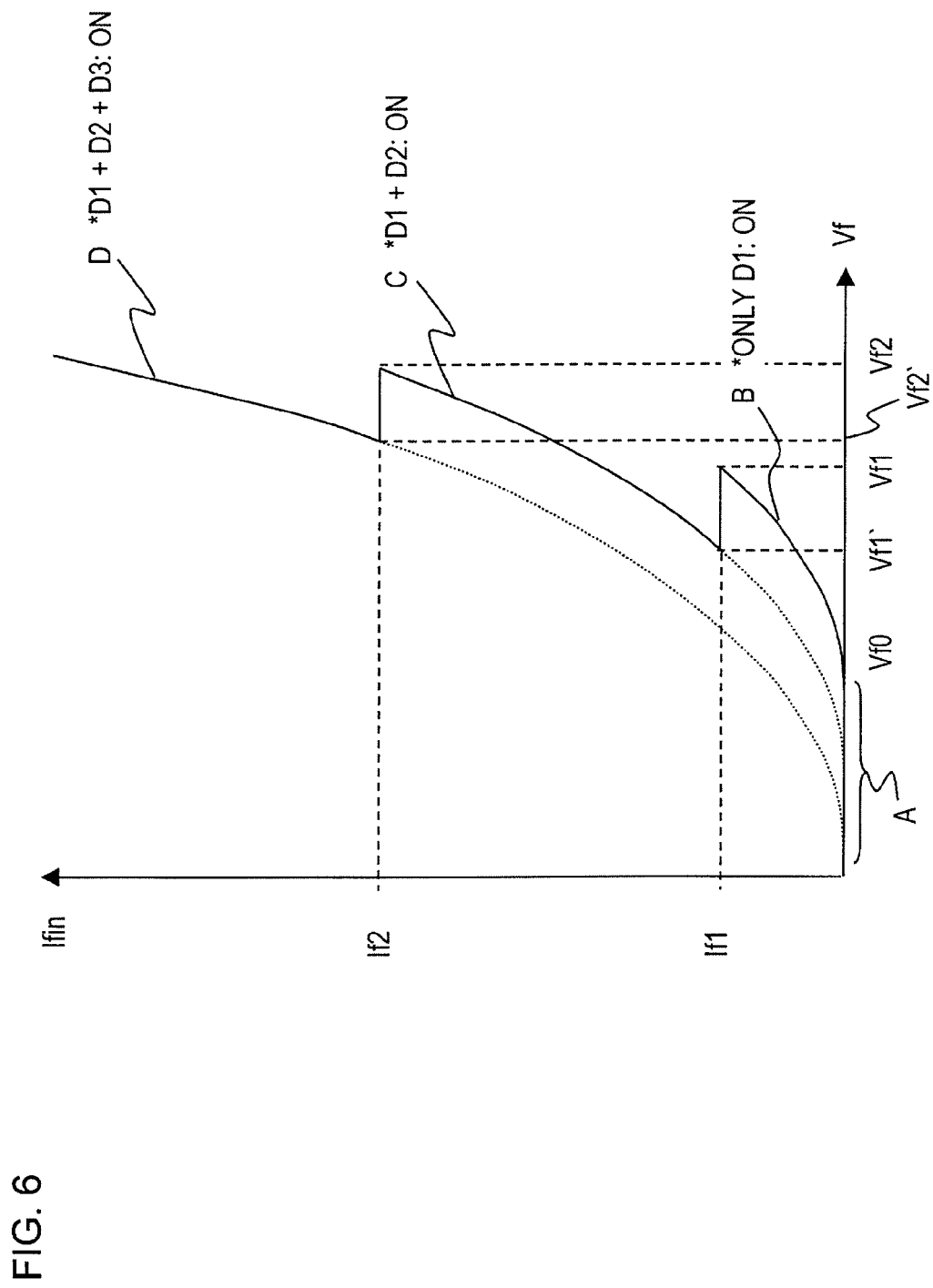
FIG. 6 is a diagram illustrating a potential difference between input and output terminals of a diode group and an input current of the diode group corresponding to the potential difference according to the first embodiment.

After time T2, the input current Ifin further increases as the potential difference Vf rises (C in FIG. 6). At the same time, the output VA1 of the amplifier VAMP1 also rises. While the output /S1 of the comparator CMP1 assumes an H level until the output VA1 once again reaches the reference voltage VREF1, since the flip-flop F1 retains the state at time T2 (the record C in FIG. 7), the drive signal G1 remains at the L level. In addition, while the output /S1 of the comparator CMP1 changes from the H level to the L level when the reference voltage VREF1 is reached, since the flip-flop F1 outputs the drive signal G1 at the same L level as at time T2 (the record A in FIG. 7), the drive signal G1 remains at the L level. In this manner, after time T2, the PMOS transistors P1 and P3 enter the on-state and the parallel connection between the main diode D1 and the sub-diode D2 is maintained.

On the other hand, at the respective diodes D1 and D2 of the diode group 23, the parasitic diodes DS1 and DS2 enter an inversely-biased state when the input current Ifin flows through the main diode D1 and the sub-diode D2. Therefore, leakage currents Isub1 and Isub2 are created. As a result, the output current Ifout assumes a current obtained by subtracting the leakage current Isub=Isub1+Isub2 from the input current Ifin. Moreover, since the leakage current Isub=Isub1+Isub2 is weak with respect to the input current Ifin, the output current Ifout is illustrated in FIG. 5 so as to increase in a similar manner to the input current Ifin.

At time T3, when the output VA1 of the amplifier VAMP1 reaches a reference voltage VREF2 (when Ifin=If2 and Vf=Vf2 in FIG. 6), the output /S2 of the comparator CMP2 changes from the H level to the L level. As a result, the drive signal G2 that is outputted from the flip-flop F2 changes from the H level to the L level (the record A in FIG. 7).

Accordingly, the PMOS transistors P2 and P4 of the diode group 23 are switched from an off-state to an on-state and the main diode D1 and the sub-diodes D2 and D3 are connected in parallel. At the same time, as illustrated in FIG. 6, the potential difference Vf between the input terminal N1 and the output terminal N2 drops from Vf2 to Vf2' and the output VA1 of the amplifier VAMP1 also drops.

In this manner, the size of the diode group 23 is enlarged from the size (D1+D2) that combines the main diode D1 and the sub-diode D2 to a size (D1+D2+D3) that combines the three diodes D1, D2, and D3.

After time T3, the input current Ifin further increases as the potential difference Vf rises (D in FIG. 6). At the same time, the output VA1 of the amplifier VAMP1 also rises. In addition, the drive signal G1 is maintained at the L level in the same manner as between times T2 and T3 as described above.

Furthermore, as for the drive signal G2, while the output /S2 of the comparator CMP2 remains at the H level until the output VA1 once again reaches the reference voltage VREF2, since the flip-flop F2 maintains the state at time T3 (the record C in FIG. 7), the drive signal G2 remains at the L level. Subsequently, when the output VA1 reaches the reference voltage VREF2, while the output /S2 of the comparator CMP2 changes from the H level to the L level, since the flip-flop F2 outputs an L-level drive signal G2 (the record A in FIG. 7), the drive signal G2 remains at the L level.

In this manner, after time T3, the drive signals G1 and G2 are maintained at the L level and the PMOS transistors P1 to P4 remain in the on-state. In other words, the parallel connection between the main diode D1 and the sub-diodes D2 and D3 is maintained.

On the other hand, at the respective diodes D1 to D3 of the diode group 23, the parasitic diodes DS1, DS2, and DS3 enter an inversely-biased state when the input current Ifin flows through the main diode D1 and the sub-diodes D2 and D3 of the diode group 23. Therefore, leakage currents Isub1, Isub2, and Isub3 are created. As a result, the output current Ifout assumes a current obtained by subtracting the leakage current Isub=Isub1+Isub2+Isub3 from the input current Ifin. Moreover, since the leakage current Isub=Isub1+Isub2+Isub3 is weak with respect to the input current Ifin, the output current Ifout is illustrated in FIG. 5 so as to increase in a similar manner to the input current Ifin.

In this manner, when the input current Ifin is small, the control circuit 24 switches the PMOS transistors P1 to P4 to the off-state and reduces the size of the diode group 23 to suppress the leakage current Isub. In addition, as the input current Ifin increases, the control circuit 24 sequentially switches the PMOS transistors P1 to P4 to the on-state in order to increase the number of diodes in the diode group 23 to be connected in parallel. Accordingly, the size of the diode group 23 is increased and becomes capable of passing a large input current Ifin.

At time T4, the input current Ifin starts to decrease and the potential difference Vf drops. At the same time, the output VA1 of the amplifier VAMP1 also drops. The input current Ifin decreases until time T7 when the potential difference Vf drops to a forward voltage Vf0 of the main diode D1 and the input current Ifin assumes zero amperes (0 A).

Between times T4 and T5, the output VA1 of the amplifier VAMP1 is higher than the reference voltage VREF2. Therefore, the outputs /S1 and /S2 of the comparators CMP1 and CMP2 both assume the L level and the drive signals G1 and G2 are both maintained at the L level (A in FIG. 7). Accordingly, the PMOS transistors P1 to P4 remain in the on-state.

Between times T5 and T6, the output VA1 of the amplifier VAMP1 becomes equal to or lower than the reference voltage VREF2 and equal to or higher than the reference voltage VREF1. Therefore, the output /S1 of the comparator CMP1 assumes the L level and the drive signal G1 is maintained at the L level (A in FIG. 7). In addition, the output /S2 of the comparator CMP2 assumes the H level and the drive signal G2 is also maintained at the L level (C in FIG. 7). Accordingly, the PMOS transistors P1 to P4 remain in the on-state.

Between times T6 and T7, the output VA1 of the amplifier VAMP1 becomes equal to or lower than the reference voltage VREF1. Therefore, the outputs /S1 and /S2 of the comparators CMP1 and CMP2 both assume the H level and the drive signals G1 and G2 are both maintained at the L level (C in FIG. 7). Accordingly, the PMOS transistors P1 to P4 remain in the on-state.

At time T7, the potential difference Vf drops to or below the forward voltage Vf0 of the main diode D1 and the input current Ifin decreases to zero amperes (0 A). Since the output VA1 of the amplifier VAMP1 is equal to or lower than the reference voltage VREF1, the PMOS transistors P1 to P4 remain in the on-state in a similar manner to between times T6 to T7.

Subsequently, when the potential difference Vf becomes zero volts (0 V) at time T8, the output R of the comparator CMP3 assumes the H level. As a result, drive signals G1 and G2 that are outputted from the flip-flops F1 and F2 both change from the L level to the H level (D in FIG. 7). As a result, PMOS transistors P1 to P4 change to an off-state and the size of the diode group 23 assumes the size of the main diode D1.

In this manner, after time T4, even if the input current Ifin decreases, the control circuit 24 maintains the PMOS transistors P1 to P4 of the diode group 23 in the on-state. Subsequently, when the potential difference between the input terminal N1 and the output terminal N2 of the diode group 23 becomes zero volts (0 V), the control circuit 24 switches the PMOS transistors P1 to P4 to the off-state and resets the diode group 23 to the state prior to time T0.

Figure 8:
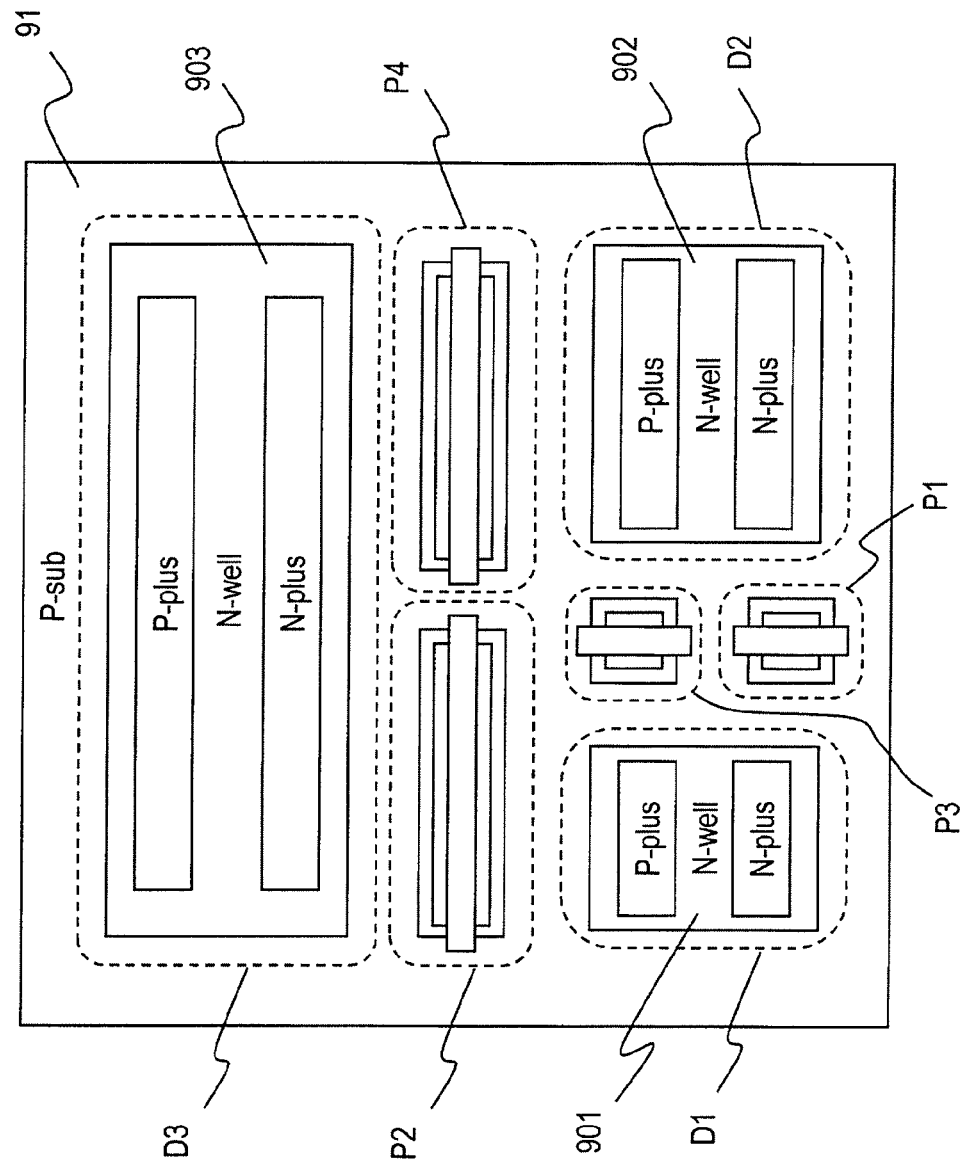
FIG. 8 is a diagram illustrating an example of a layout in which diodes are arranged on a P-substrate according to the first embodiment.

FIG. 8 is a diagram illustrating an example of a layout in which diodes are arranged on a P-substrate according to the first embodiment. FIG. 8 illustrates a layout example on a P-substrate 91 in a case where sizes the respective diodes D1 to D3 illustrated in FIG. 4 are in a descending order of diodes D3, D2, and D1. As described with reference to FIG. 2, since an object of the diode circuit 22 is to suppress leakage currents from N-well regions 901, 902, and 903 to the P-substrate 91, the diodes D1 to D3 desirably separate and electrically insulate the respective N-well regions 901, 902, and 903 from one another as illustrated in FIG. 8.

Figure 9:
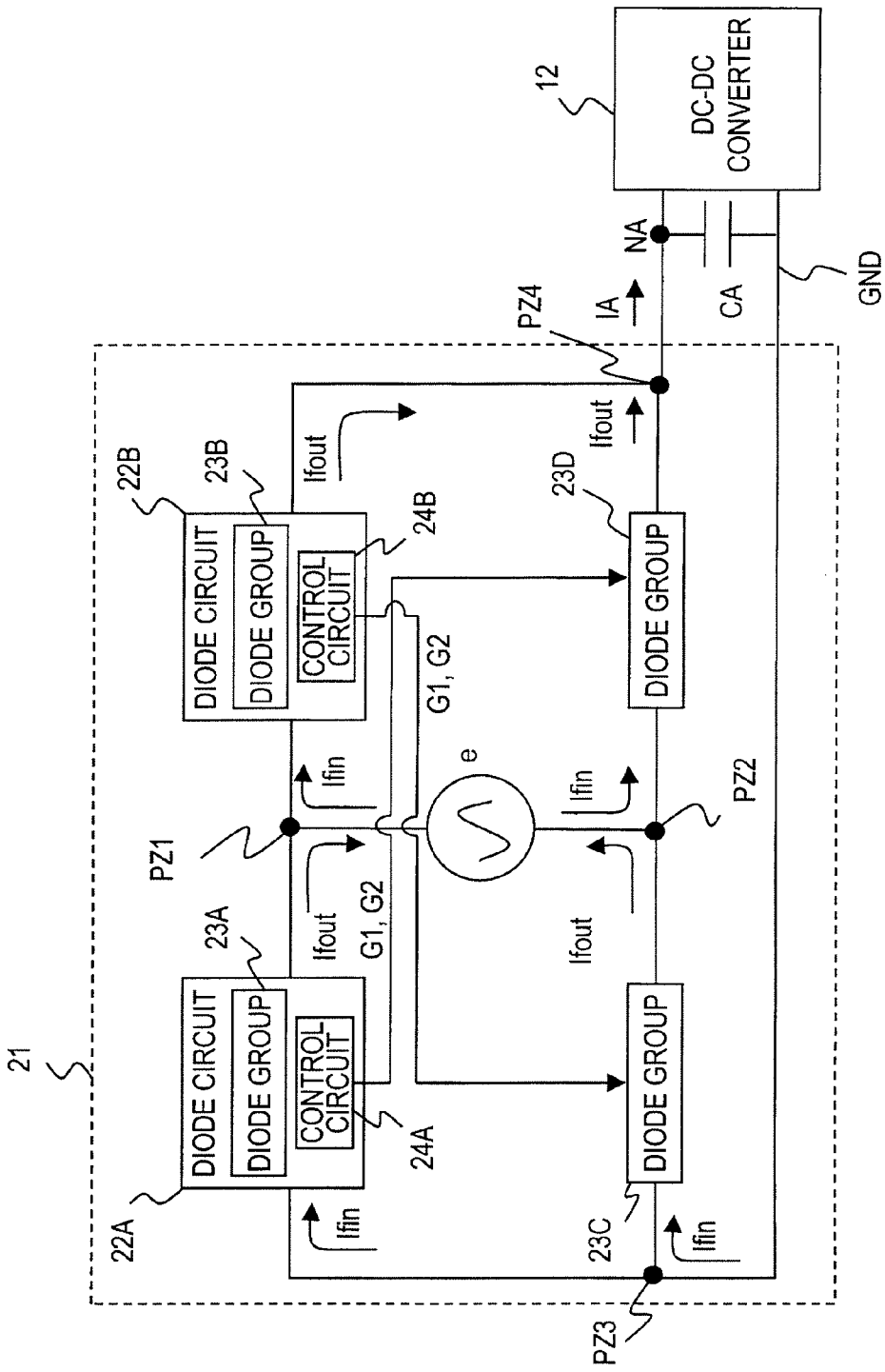
FIG. 9 is a diagram illustrating a second bridge rectifier circuit according to the first embodiment.

FIG. 9 is a diagram illustrating a second bridge rectifier circuit according to the first embodiment. A bridge rectifier circuit 21 illustrated in FIG. 9 is configured such that the diode circuits 22C and 22D in FIG. 3 are replaced by diode groups 23C and 23D which have the same configuration as that of the diode group 23.

In FIG. 9, based on the input current Ifin of the diode group 23B, the control circuit 24B of the diode circuit 22B outputs the drive signals G1 and G2 not only to the diode group 23B but also to the diode group 23C that is on a path of the first rectification direction in the order of "AC power source e→input terminal PZ1→diode circuit 22B→output terminal PZ4→capacitor CA→reference voltage GND→output terminal PZ3→diode group 23C→input terminal PZ2→AC power source e". In other words, the control circuit 24B controls sizes of diodes of the diode group 23B and the diode group 23C.

In a similar manner, based on the input current Ifin of the diode group 23A, the control circuit 24A of the diode circuit 22A outputs the drive signals G1 and G2 not only to the diode group 23A but also to the diode group 23D that is on a path of the second rectification direction in an order of "AC power source e→input terminal PZ2→diode group 23D→output terminal PZ4→capacitor CA→reference voltage GND→output terminal PZ3→diode circuit 22A→input terminal PZ1→AC power source e". In other words, the control circuit 24A controls sizes of diodes of the diode group 23A and the diode group 23D.

Figure 10:
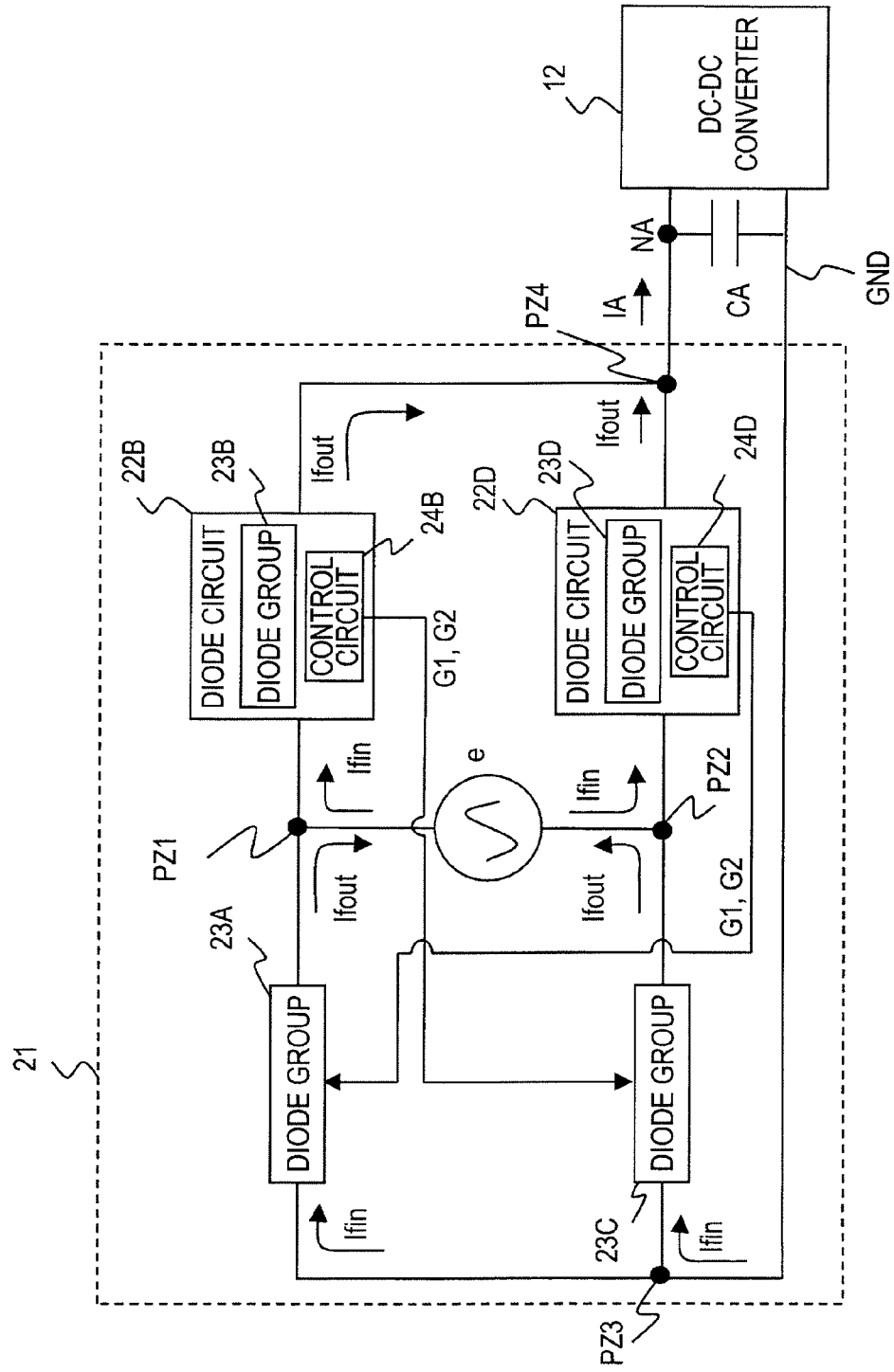
FIG. 10 is a diagram illustrating a third bridge rectifier circuit according to the first embodiment.
Figure 11:
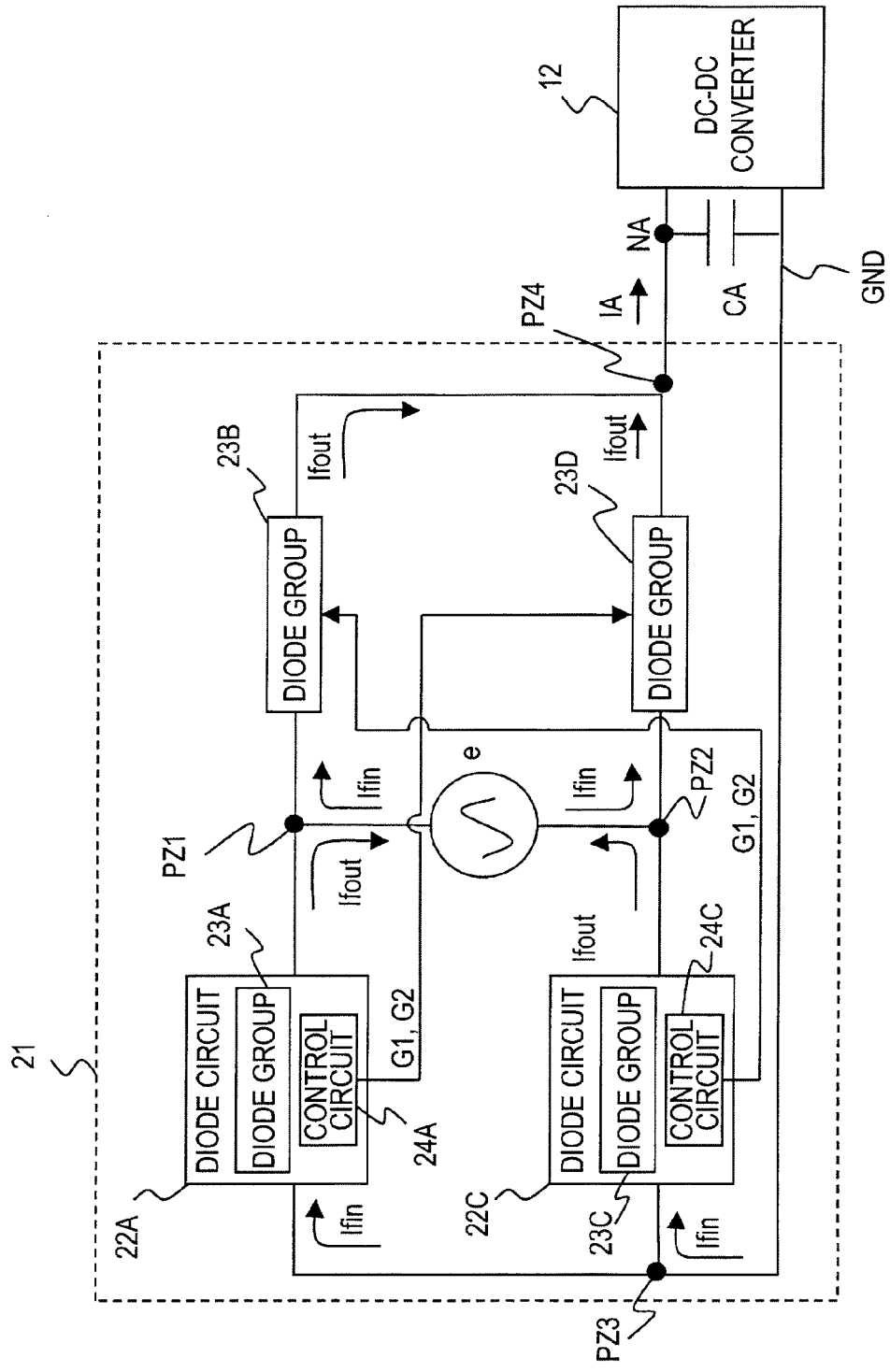
FIG. 11 is a diagram illustrating a fourth bridge rectifier circuit according to the first embodiment.

Alternatively, the bridge rectifier circuit 21 may be configured as illustrated in FIGS. 10 and 11 in a similar manner to FIG. 9. FIG. 10 is a diagram illustrating a third bridge rectifier circuit according to the first embodiment. A bridge rectifier circuit 21 illustrated in FIG. 10 is configured such that the diode circuits 22A and 22C in FIG. 3 are replaced by diode groups 23A and 23C which have the same configuration as that of the diode group 23.

The drive signals G1 and G2 outputted by the control circuit 24B of the diode circuit 22B are supplied not only to the diode group 23B of the diode circuit 22B but also to the diode group 23C. In a similar manner, the drive signals G1 and G2 outputted by the control circuit 24D of the diode circuit 22D are supplied not only to the diode group 23D of the diode circuit 22D but also to the diode group 23A.

FIG. 11 is a diagram illustrating a fourth bridge rectifier circuit according to the first embodiment. A bridge rectifier circuit 21 illustrated in FIG. 11 is configured such that the diode circuits 22B and 22D in FIG. 3 are replaced by diode groups 23B and 23D which have the same configuration as that of the diode group 23.

The drive signals G1 and G2 outputted by the control circuit 24A of the diode circuit 22A are supplied not only to the diode group 23A of the diode circuit 22A but also to the diode group 23D. In a similar manner, the drive signals G1 and G2 outputted by the control circuit 24C of the diode circuit 22C are supplied not only to the diode group 23C of the diode circuit 22C but also to the diode group 23B.

As illustrated in FIGS. 9 to 11, since a pair of diode groups, existing on a path of the first or second rectification direction along which the input current Ifin, flows each pass the same current, therefore, with respect to the pair of diode groups existing on a path of each rectification direction, a common control circuit controls sizes of diodes of the pair of diode groups through which the input current Ifin flows based on the input current Ifin of each diode group. Accordingly, the bridge rectifier circuit 21 illustrated in FIGS. 9 to 11 is capable of reducing circuit area as compared to a case where a control circuit is provided per diode group as illustrated in FIG. 3.

Figure 12:
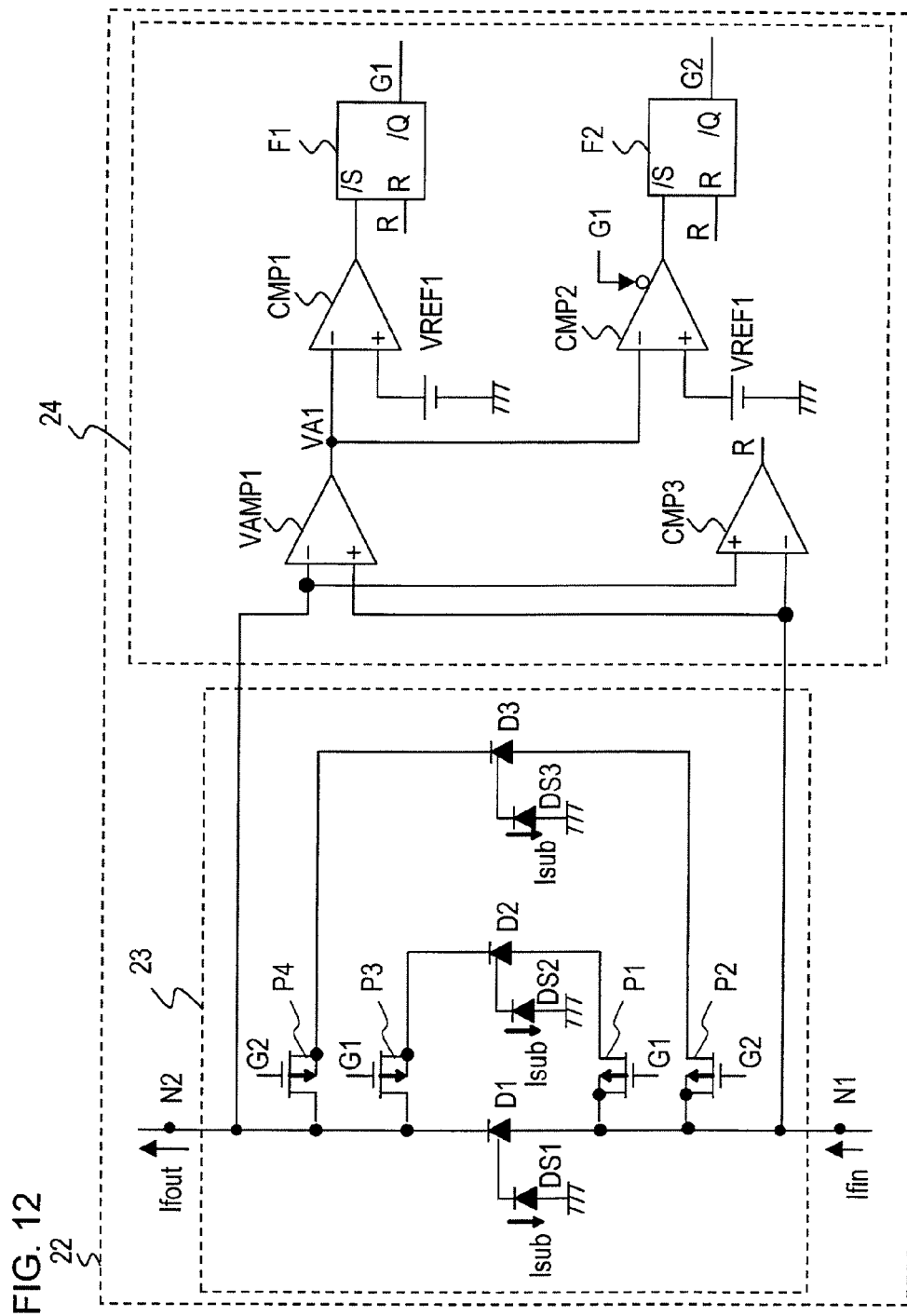
FIG. 12 is a diagram illustrating a second diode circuit according to the first embodiment.

FIG. 12 is a diagram illustrating a second diode circuit according to the first embodiment. In FIG. 12, portions that overlap with FIG. 4 are denoted by similar reference signs.

In this case, in FIGS. 4 and 5, the sub-diodes D2 and D3 are connected to the main diode D1 in an order of D2 and D3 after time T0 when the AC power source e starts energy harvesting. On the other hand, the comparator CMP2 performs a comparison operation from time T0 to time T3 when the output VA1 of the amplifier VAMP1 reaches the reference voltage VREF2 of the comparator CMP2. Therefore, if the comparison operation of the comparator CMP2 is originally started at time T2, there is no need to perform the comparison operation between times T0 and T2.

In consideration thereof, in FIG. 12, in the diode circuit 22, the comparator CMP2 starts a comparison operation after the sub-diode D2 is connected to the main diode D1. As a result, the diode circuit 22 is capable of reducing current consumption by the comparator as compared to the configuration illustrated in FIG. 4.

Unlike FIG. 4, the comparator CMP2 illustrated in FIG. 12 is supplied with an inversion signal of the drive signal G1 as an enable signal. When the drive signal G1 is at the H level, the comparator CMP2 enters an inactive state and outputs a constant output /S2 at the H level. When the drive signal G1 assumes the L level or, in other words, when the sub-diode D2 is connected to the main diode D1, the comparator CMP2 enters an active state and performs a comparison operation.

In addition, the control circuit 24 illustrated in FIG. 12 uses VREF1 in a similar manner to the comparator CMP1 instead of VREF2 as the reference voltage to be connected to the inverting input terminal of the comparator CMP2. Since the comparator CMP2 starts a comparison operation after the sub-diode D2 is connected to the main diode D1, the control circuit 24 illustrated in FIG. 12 is also capable of increasing the size of diodes in the diode group 23 in stages using one reference voltage.

Figure 13:
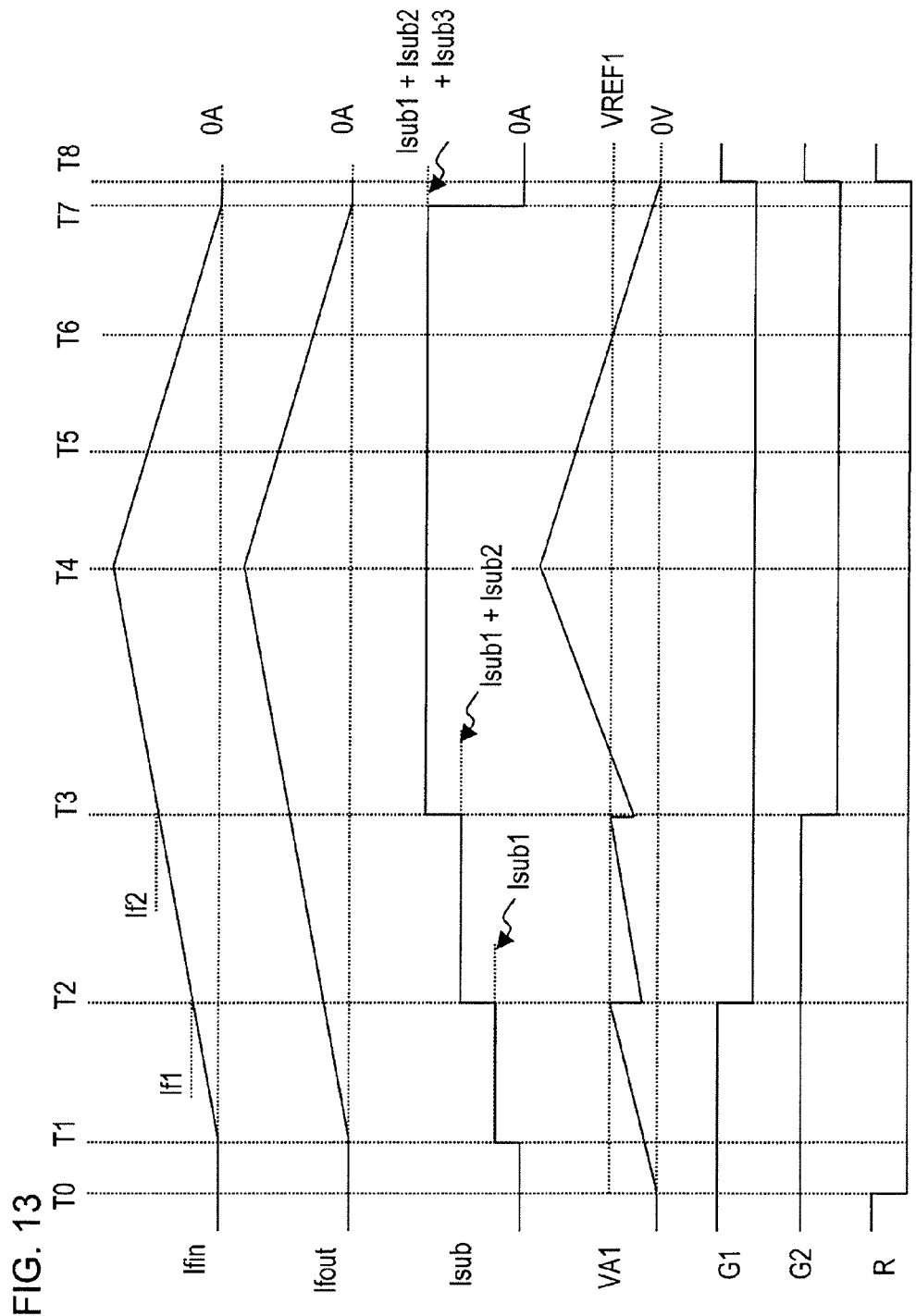
FIG. 13 is a timing diagram of the second diode circuit according to the first embodiment.

FIG. 13 is a timing diagram of the second diode circuit according to the first embodiment. FIG. 13 illustrates a specific operation example of a diode circuit 22 illustrated in FIG. 12.

In FIG. 13, up to time T0, the potential difference Vf between the input terminal N1 and the output terminal N2 of the diode group 23 assumes zero volts (0 V), and the input current Ifin assumes zero amperes (0 A) in a similar manner to FIG. 5.

Therefore, in a similar manner to FIG. 5, the output R of the comparator CMP3 assumes the H level, the output /S1 of the comparator CMP1 assumes the H level, and the drive signal G1 that is an output of the flip-flop F1 assumes the H level. Accordingly, the comparator CMP2 does not perform a comparison operation and outputs a constant output /S2 at the H level. In addition, the drive signal G2 that is an output of the flip-flop F2 assumes the H level (B in FIG. 7).

In this case, the H level is supplied to the respective gates of the PMOS transistors P1 to P4 of the diode group 23 and the PMOS transistors P1 to P4 all enter an off-state. Therefore, when the potential difference Vf is zero volts (0 V), the diode size of the diode group 23 assumes a size of the main diode D1.

In addition, after time T0, the comparator CMP1 and the flip-flop F1 operate in a similar manner to that illustrated in FIG. 5. However, since the drive signal G1 is at the H level until time T2 when the output VA1 of the amplifier VAMP1 initially reaches the reference voltage VREF1, the comparator CMP2 is non-active and the output /S2 of the comparator CMP2 is maintained at the H level. Accordingly, the flip-flop F2 maintains the drive signal G2 at the state prior to time T0 (C in FIG. 7). In this manner, between times T0 and T2, a comparison operation of the comparator CMP2 is not performed and the PMOS transistors P1 to P4 remain in the off-state, and current consumption of the comparator CMP2 is suppressed.

Since the drive signal G1 changes from the H level to the L level at time T2, the comparator CMP2 starts performing a comparison operation at time T2 and outputs an H-level output /S2. Accordingly, the flip-flop F2 maintains the drive signal G2 at the state of T2 or, in other words, at the H level (C in FIG. 7). Moreover, the size of the diodes of the diode group 23 at time T2 is increased to a size (D1+D2) that combines the main diode D1 and the sub-diode D2 in a similar manner to FIG. 5.

When the output VA1 of the amplifier VAMP1 once again reaches the reference voltage VREF1 at time T3, the output /S2 of the comparator CMP2 changes from the H level to the L level. In addition, the drive signal G2 that is outputted from the flip-flop F2 changes from the H level to the L level (A in FIG. 7). Accordingly, the PMOS transistors P1 to P4 all assume the on-state. In other words, the size of the diodes of the diode group 23 is increased to a size (D1+D2+D3) that combines the main diode D1 and the sub-diodes D2 and D3 in a similar manner to FIG. 5.

After time T3, the comparator CMP2 operates in a similar manner to the comparator CMP1. In other words, the comparator CMP2 operates in a similar manner to the comparator CMP1 illustrated in FIG. 5. As a result, the drive signals G1 and G2 are maintained at the L level until time T8 when the potential difference Vf assumes zero volts (0 V). In other words, the size of the diode group 23 remains at the size (D1+D2+D3) that combines the main diode D1 and the sub-diodes D2 and D3.

In addition, as the output R of the comparator CMP3 rises from the L level to the H level at time T8, the drive signals G1 and G2 are reset to the H level. In other words, the size of the diode group 23 is reset to the size of the main diode D1.

As described above, according to the first embodiment, the control circuit 24 of the diode circuit 22 illustrated in FIG. 4 or FIG. 12 reduces the size of the diodes of the diode group 23 down to the size of the main diode D1 when the input current Ifin is small in order to suppress the leakage current Isub. In addition, as the input current Ifin increases, the control circuit 24 controls the PMOS transistors P1 to P4 so as to increase the number of sub-diodes to be connected in parallel to the main diode D1 in order to increase the size of the diodes of the diode group 23 and enable a large input current Ifin to flow.

Second Embodiment

In the first embodiment, after time T4 described with reference to FIGS. 5 and 13, the size of the diodes of the diode group 23 in FIG. 4 is maintained at a size combining the diodes D1 to D3 even if the input current Ifin decreases. Therefore, when the input current Ifin decreases, the ratio of the leakage current Isub increases. While the leakage current is suppressed when the input current Ifin decreases by further providing the control circuit 24 illustrated in FIG. 4 with a circuit that reduces the size of the diodes of the diode group 23 in accordance with a decrease in VA1, this results in an increased size of the control circuit 24.

In consideration thereof, in the second embodiment, the diode groups 23A to 23D illustrated in FIGS. 3 and 9 to 11 share the configuration of a diode group 33 (to be described later) and the control circuits 24A to 24D share the configuration of a control circuit 34 (to be described later). Accordingly, the bridge rectifier circuit 11 illustrated in FIGS. 3 and 9 to 11 is capable of reducing the size of the diodes and reducing the leakage current as the input current Ifin decreases.

Figure 14:
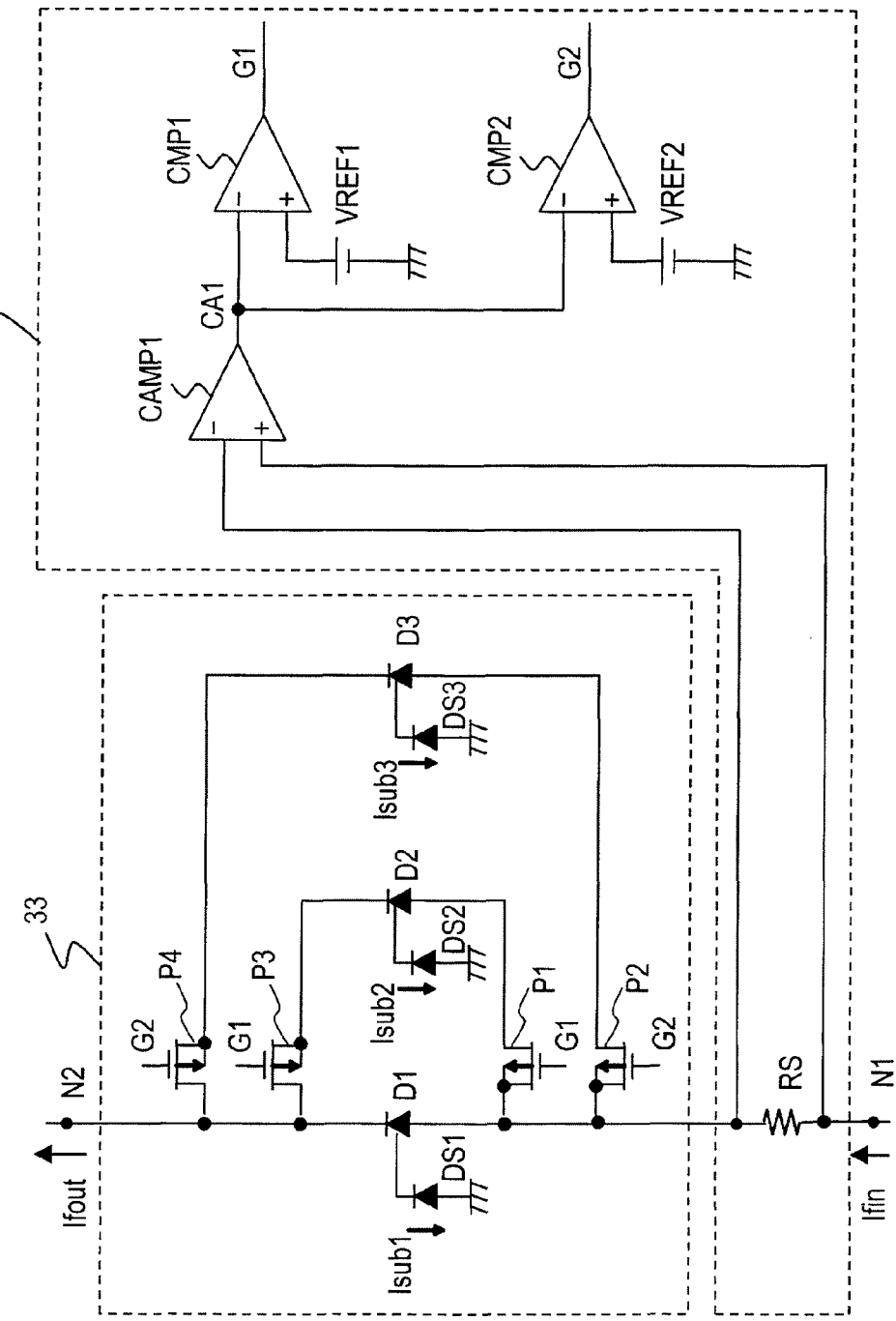
FIG. 14 is a diagram illustrating a first diode group and a control circuit according to the second embodiment.

FIG. 14 is a diagram illustrating a first diode group and a control circuit according to the second embodiment. The diode group 33 illustrated in FIG. 14 has a similar configuration to that of the diode group 23 according to the first embodiment illustrated in FIG. 4. Moreover, portions that overlap with FIG. 4 are denoted by similar reference signs.

In the control circuit 34, a sense resistor RS is provided between an input terminal N1 and the diode group 33, and an amplifier CAMP1 for sensing current detects an input current Ifin based on a potential difference between both terminals of the sense resistor RS. In addition, a comparator CMP1 compares an output CA1 of the amplifier CAMP1 with a reference voltage VREF1 and outputs a drive signal G1 to the gates of PMOS transistors P1 and P3. Furthermore, a comparator CMP2 compares the output CA1 of the amplifier CAMP1 with a reference voltage VREF2 that is higher than the reference voltage VREF1 and outputs a drive signal G2 to the gates of PMOS transistors P2 and P4.

Due to the configuration described above, as the input current Ifin increases, the control circuit 34 controls the PMOS transistors P1 to P4 from an off-state to an on-state in an order of P1 and P3, P2 and P4 to increase the size of the diodes of the diode group 33. In addition, as the input current Ifin decreases, the control circuit 34 controls the PMOS transistors P1 to P4 from the on-state to the off-state in an order of P2 and P4, P1 and P3 to reduce the size of the diodes of the diode group 33.

Figure 15:
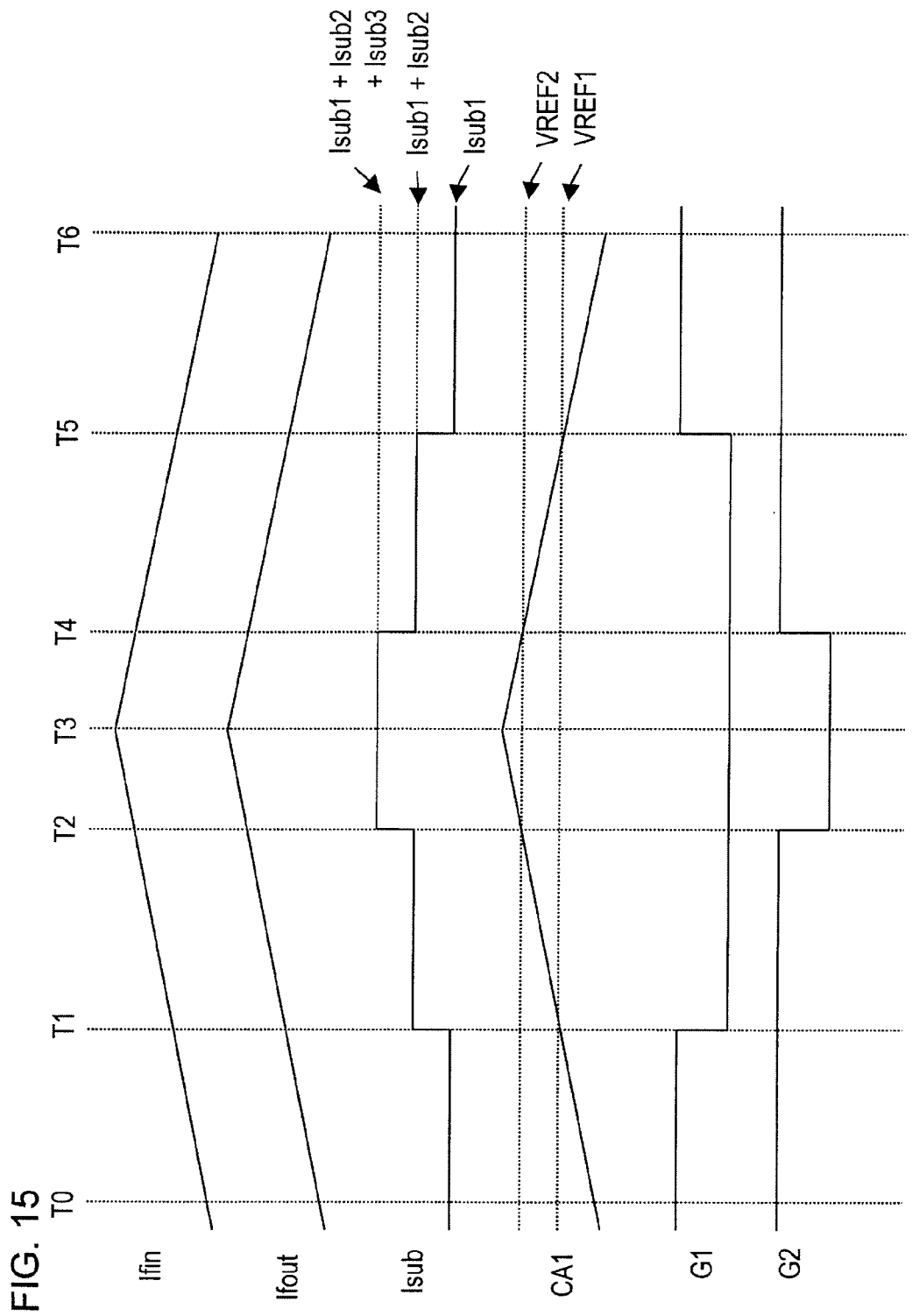
FIG. 15 is a timing diagram of the first diode group and the control circuit according to the second embodiment.

FIG. 15 is a timing diagram of the first diode group and the control circuit according to the second embodiment. The timing diagram of FIG. 15 represents an output current Ifout of the output terminal N2, a leakage current Isub, the output CA1 of the amplifier CAMP1, and the drive signals G1 and G2 when the input current Ifin increases or decreases as illustrated in FIG. 15 from time T0 to time T6.

At time T0, since the potential difference between both terminals of the sense resistor RS increases as the input current Ifin increases, the output CA1 of the amplifier CAMP1 rises. At this point, since the output CA1 is lower than the reference voltage VREF1, the comparators CMP1 and CMP2 respectively output H-level drive signals G1 and G2.

Accordingly, the PMOS transistors P1 to P4 of the diode group 33 all enter the off-state and the diode size of the diode group 33 assumes the size of the main diode D1.

At this point, when the input current Ifin flows through the main diode D1, since a parasitic diode DS1 enters an inversely-biased state, a leakage current Isub=Isub1 is created. Therefore, the output current Ifout assumes a current obtained by subtracting the leakage current Isub=Isub1 from the input current Ifin. Moreover, since the leakage current Isub=Isub1 is weak with respect to the input current Ifin, the output current Ifout is illustrated in FIG. 15 so as to increase in a similar manner to the input current Ifin.

At time T1, as the output CA1 of the amplifier CAMP1 reaches the reference voltage VREF1, the comparator CMP1 changes the drive signal G1 from the H level to the L level and the comparator CMP2 maintains the H-level drive signal G2.

Accordingly, among the PMOS transistors P1 to P4 of the diode group 33, the PMOS transistors P1 and P3 enter the on-state and the PMOS transistors P2 and P4 maintain the off-state. In other words, the size of the diodes of the diode group 33 is increased to a size (D1+D2) that combines the main diode D1 and the sub-diode D2.

Subsequently, when the input current Ifin flows through the diodes D1 and D2, since the parasitic diodes DS1 and DS2 enter an inversely-biased state, a leakage current Isub=Isub1+Isub2 is created. As a result, the output current Ifout assumes a current obtained by subtracting the leakage current Isub=Isub1+Isub2 from the input current Ifin. Moreover, since the leakage current Isub=Isub1+Isub2 is weak with respect to the input current Ifin, the output current Ifout is illustrated in FIG. 15 so as to increase in a similar manner to the input current Ifin.

At time T2, as the output CA1 of the amplifier CAMP1 reaches the reference voltage VREF2, the comparator CMP1 maintains the drive signal G1 at the L level and the comparator CMP2 changes the drive signal G2 from the H level to the L level.

Accordingly, the PMOS transistors P1 to P4 of the diode group 33 all enter the on-state. In other words, the diode size of the diode group 33 is increased to a size (D1+D2+D3) that combines the main diode D1 and the sub-diodes D2 and D3.

Subsequently, when the input current Ifin flows through the diodes D1 to D3, since the parasitic diodes DS1 to DS3 enter an inversely-biased state, a leakage current Isub=Isub1+Isub2+Isub3 is created. As a result, the output current Ifout assumes a current obtained by subtracting the leakage current Isub=Isub1+Isub2+Isub3 from the input current Ifin. Moreover, since the leakage current Isub=Isub1+Isub2+Isub3 is weak with respect to the input current Ifin, the output current Ifout is illustrated in FIG. 15 so as to increase in a similar manner to the input current Ifin.

The input current Ifin starts decreasing from time T3 and, accordingly, the potential difference between both terminals of the sense resistor RS decreases. At the same time, the output CA1 of the amplifier CAMP1 also drops. In addition, at time T4, as the output CA1 of the amplifier CAMP1 decreases below the reference voltage VREF2, the comparator CMP1 maintains the L-level drive signal G1 but the comparator CMP2 changes the drive signal G2 from the L level to the H level.

Accordingly, although the PMOS transistors P1 and P3 of the diode group 33 remain in the on-state, the PMOS transistors P2 and P4 are changed to the off-state. In other words, the diode size of the diode group 33 is reduced to a size (D1+D2) that combines the main diode D1 and the sub-diode D2. As a result, the leakage current created in the diode group 33 decreases to the leakage current Isub=Isub1+Isub2 of the parasitic diodes DS1 and DS2.

At time T5, as the output CA1 of the amplifier CAMP1 drops below the reference voltage VREF1, the comparator CMP1 changes the drive signal G1 from the L level to the H level and the comparator CMP2 maintains the drive signal G2 at the H level.

Accordingly, the PMOS transistors P1 to P4 of the diode group 33 all enter the off-state and the diode size of the diode group 33 is reduced to the size of the main diode D1. As a result, the leakage current created in the diode group 33 decreases to the leakage current Isub=Isub1 of the parasitic diode DS1.

As described above, according to the second embodiment, the control circuit 34 controls a size of the diodes of the diode group 33 in accordance with the input current Ifin, with a relatively small-sized configuration which does not include the flip-flops F1 and F2 illustrated in FIGS. 4 and 12 and which includes a single sense resistor SR, a single amplifier CAMP1, and two comparators CMP1 and CMP2. In other words, as the input current Ifin increases, the control circuit 34 increases the size of the diodes and allows a larger input current Ifin to flow. In addition, as the input current Ifin decreases, the control circuit 34 reduces the size of the diodes to suppress the leakage current.

Furthermore, due to the diode groups 23A to 23D illustrated in FIGS. 3 and 9 to 11 having the configuration of the diode group 33 illustrated in FIG. 14 and the control circuits 24A to 24D having the configuration of the control circuit 34, the bridge rectifier circuit 11 is able to suppress the leakage current and convert an AC current into a DC current IA.

Figure 16:
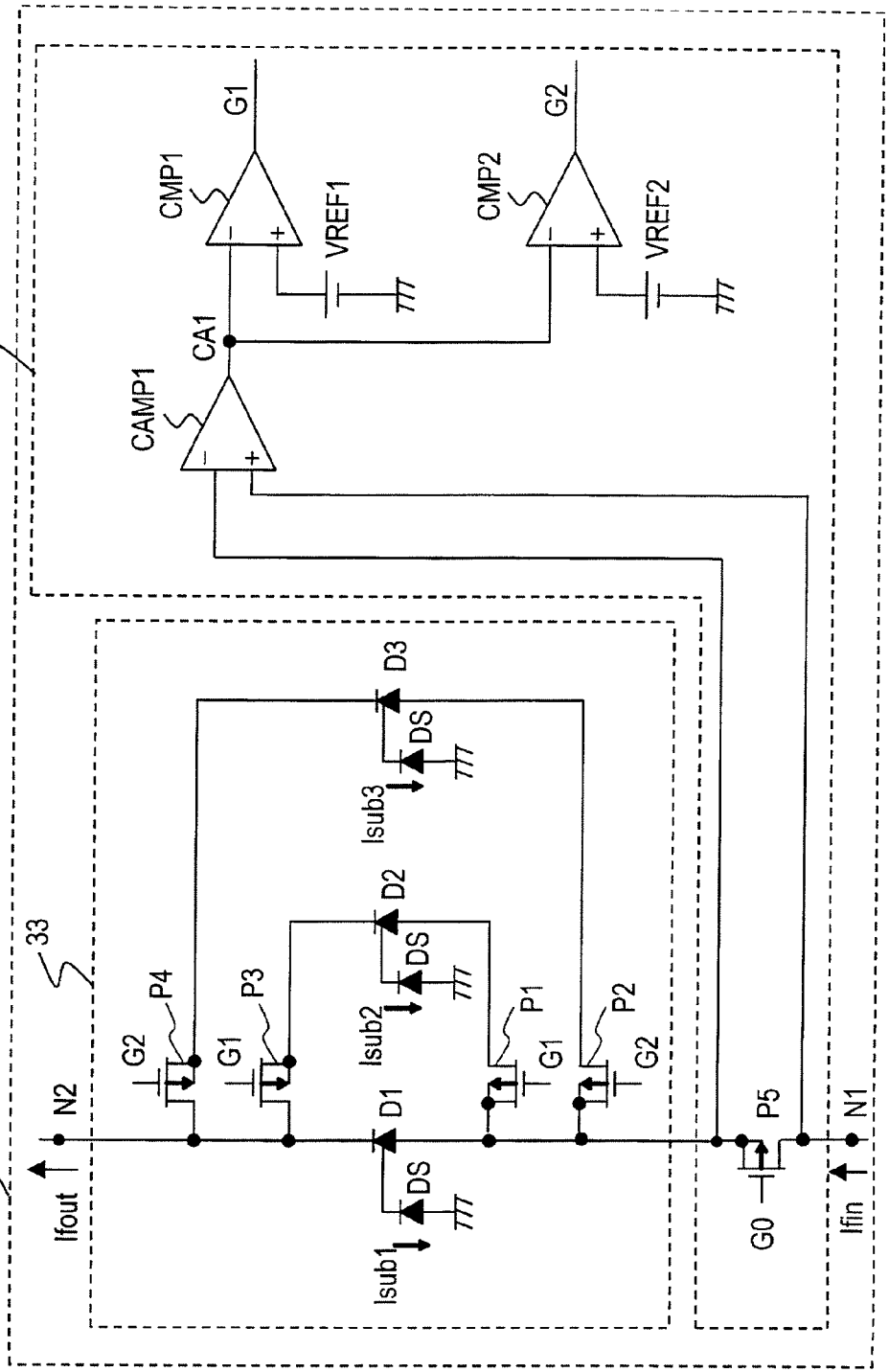
FIG. 16 is a diagram illustrating a second diode circuit according to the second embodiment.

FIG. 16 is a diagram illustrating a second diode circuit according to the second embodiment. A control circuit 34 illustrated in FIG. 16 is a modification of the control circuit 34 illustrated in FIG. 14. The control circuit 34 illustrated in FIG. 16 includes a MOS transistor P5 in place of the sense resistor RS. In addition, portions in FIG. 16 which overlap with FIG. 14 are denoted by similar reference signs.

In the case of FIG. 16, a control signal G0 is supplied to the gate of the transistor P5 from the outside. Upon operation of the bridge rectifier circuit, the control signal G0 assumes the L level and the transistor P5 enters a non-saturated and conductive state. When an input current Ifin flows to the non-saturated transistor P5, based on an on-resistance of the transistor P5, a potential difference between both terminals of the transistor P5 increases as the input current Ifin increases. Subsequently, as the input current Ifin decreases, the potential difference between both terminals of the transistor P5 decreases. In addition, the control circuit 34 outputs the drive signals G1 and G2 based on the potential difference between both terminals of the transistor P5 in a similar manner to the control circuit 34 illustrated in FIG. 14. As a result, the size of the diodes of the diode group 33 is increased as the input current Ifin increases and is reduced as the input current Ifin decreases in a similar manner to the diode group 33 illustrated in FIG. 14. Accordingly, the leakage current created in the diode group 33 is suppressed.

Third Embodiment

Figure 17:
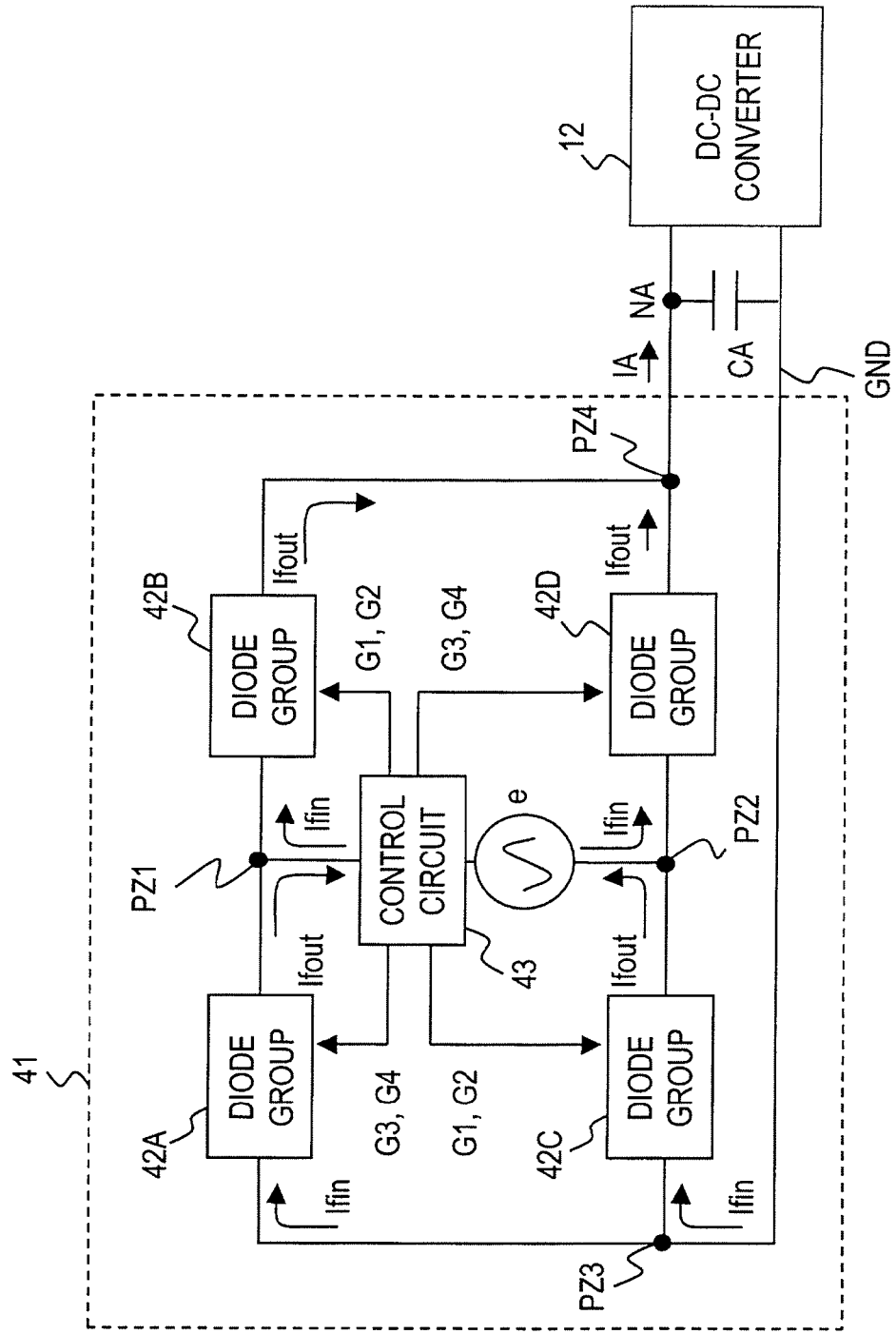
FIG. 17 is a diagram illustrating a bridge rectifier circuit according to a third embodiment.

FIG. 17 is a diagram illustrating a bridge rectifier circuit according to a third embodiment. In the first and second embodiments, a control circuit provided for each diode group as illustrated in FIG. 3 controls a single corresponding diode group, and a control circuit provided on each path in a first rectification direction or a second rectification direction of an input current Ifin as illustrated in FIGS. 9 to 11 controls a pair of diode groups on the path. In contrast, in the third embodiment, a single control circuit which is provided between input terminals PZ1 and PZ2 and which is connected to an AC power source e as illustrated in FIG. 17 controls four diode groups based on a magnitude and a direction of flow of an input current Ifin outputted from the AC power source e. Accordingly, a circuit area of the control circuit is further reduced as compared to the first and second embodiments.

Specifically, in FIG. 17, an AC input current Ifin is outputted from the AC power source e. The input current Ifin flows in either a first rectification direction in an order of "AC power source e→input terminal PZ1→diode group 42B→output terminal PZ4→capacitor CA→reference voltage GND→output terminal PZ3→diode group 42C→input terminal PZ2→AC power source e" or a second rectification direction in an order of "AC power source e→input terminal PZ2→diode group 42D→output terminal PZ4→capacitor CA→reference voltage GND→output terminal PZ3→diode group 42A→input terminal PZ1→AC power source e".

A single control circuit 43 is provided between the input terminals PZ1 and PZ2. When the input current Ifin flows in the first rectification direction, the control circuit 43 controls a size of the diodes of the diode groups 42B and 42C through which the input current Ifin flows, based on a magnitude of the input current Ifin. In addition, when the input current Ifin flows in the second rectification direction, the control circuit 43 controls a size of the diodes of the diode groups 42A and 42D through which the input current Ifin flows, based on the magnitude of the input current Ifin.

Figure 18:
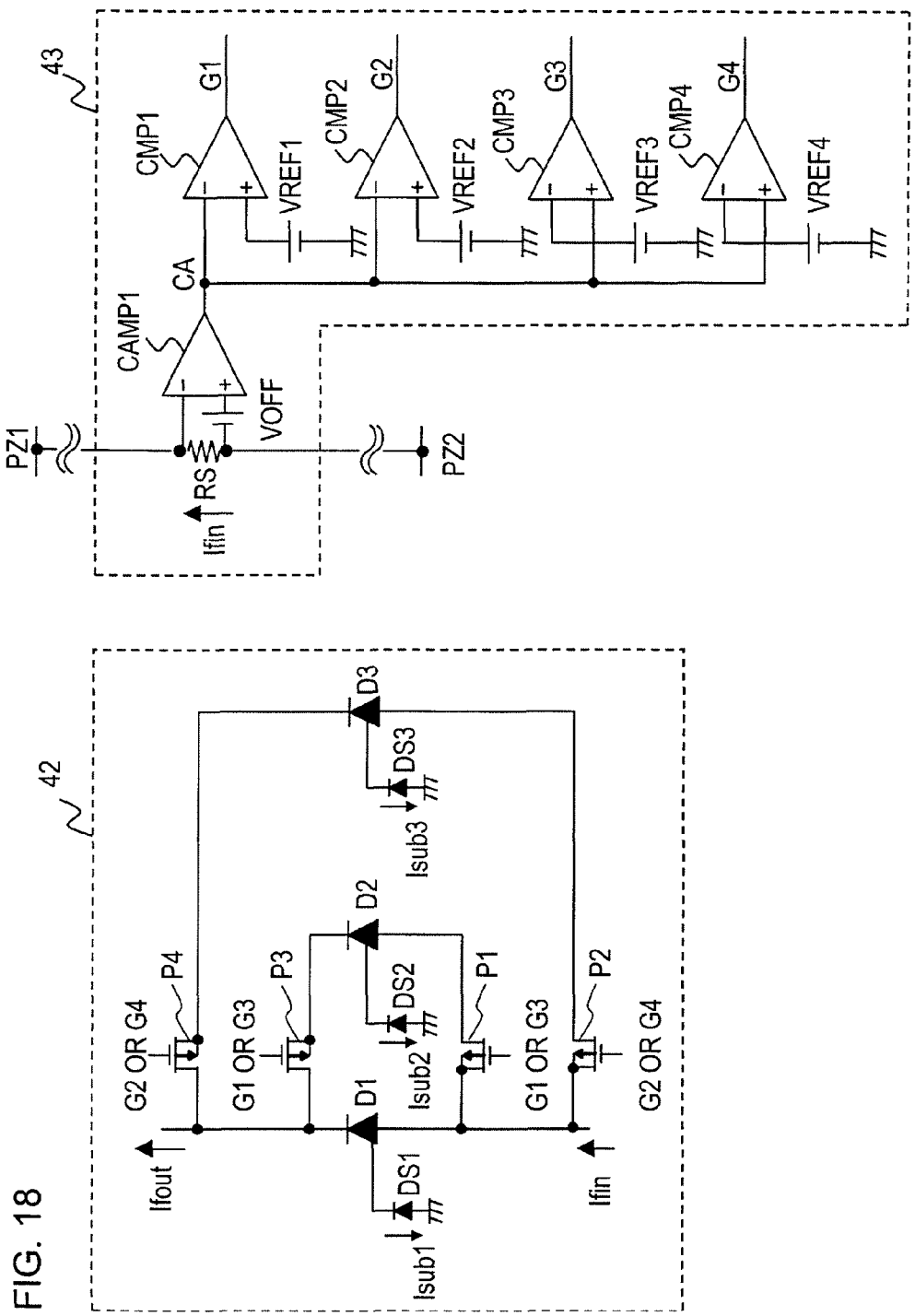
FIG. 18 is a diagram illustrating a diode group and a control circuit according to the third embodiment.

FIG. 18 is a diagram illustrating a diode group and a control circuit according to the third embodiment. The diode group 42 that represents a configuration of the diode groups 42A to 42D illustrated in FIG. 17 has a similar configuration to the diode group 23 according to the first embodiment. Moreover, portions that overlap with FIG. 4 are denoted by similar reference signs.

In the control circuit 43, first, an amplifier CAMP1 with a gain Av amplifies a potential difference between both terminals of a sense resistor RS provided between the input terminals PZ1 and PZ2 and produces an output CA1. Moreover, an offset voltage VOFF is provided between one terminal of the sense resistor RS and a non-inverting input terminal of the amplifier CAMP1.

In addition, comparators CMP1 to CMP4 compare the output CA of the amplifier CAMP1 with reference voltages VREF1 to VREF4 that respectively connect to the comparators CMP1 to CMP4 and output drive signals G1 to G4.

Moreover, the reference voltages have a descending order of potentials of VREF2, VREF1, VREF3, and VREF4 (VREF2>VREF1>Vb>VREF3>VREF4). In addition, while the reference voltages VREF1 and VREF2 are connected to non-inverting input terminals of respectively corresponding comparators CMP1 and CMP2, the reference voltages VREF3 and VREF4 are connected to inverting input terminals of respectively corresponding comparators CMP3 and CMP4.

The drive signals G1 and G2 respectively outputted from the comparators CMP1 and CMP2 are supplied to the diode groups 42B and 42C in the first rectification direction of the input current Ifin. Specifically, the drive signal G1 is supplied to the PMOS transistors P1 and P3 of the diode groups 42B and 42C, and the drive signal G2 is supplied to the PMOS transistors P2 and P4 of the diode groups 42B and 42C.

In addition, the drive signals G3 and G4 respectively outputted from the comparators CMP3 and CMP4 are supplied to the diode groups 42A and 42D in the second rectification direction of the input current Ifin. Specifically, the drive signal G3 is supplied to the PMOS transistors P1 and P3 of the diode groups 42A and 42D, and the drive signal G4 is supplied to the PMOS transistors P2 and P4 of the diode groups 42A and 42D.

Accordingly, when the input current Ifin flows from the input terminal PZ2 to the input terminal PZ1 (the first rectification direction), the control circuit 43 controls the size of the diodes of the diode groups 42B and 42C based on the input current Ifin. Conversely, when the input current Ifin flows from the input terminal PZ1 to the input terminal PZ2 (the second rectification direction), the control circuit 43 controls the size of the diodes of the diode groups 42A and 42D based on the input current Ifin.

Figure 19:
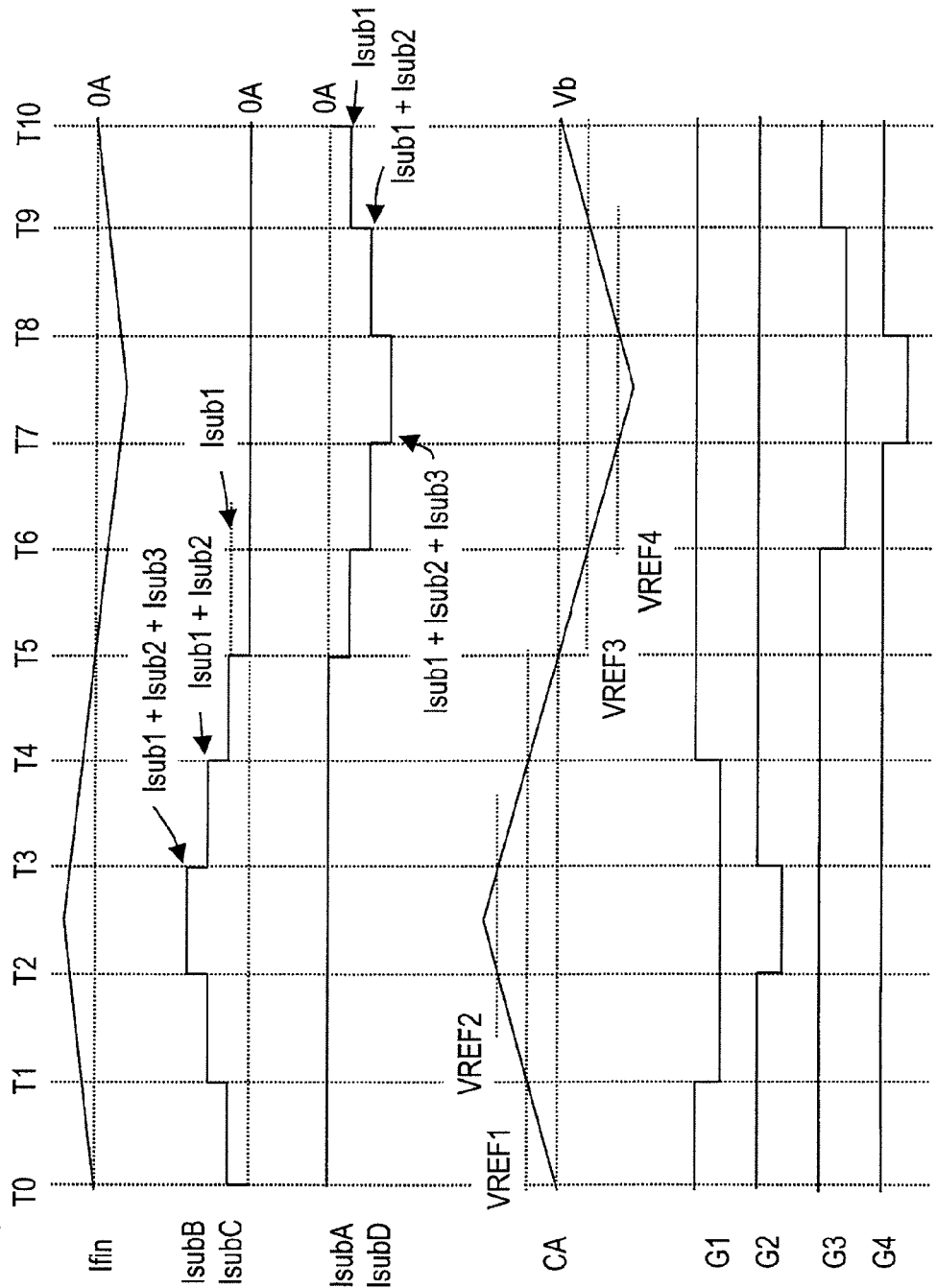
FIG. 19 is a timing diagram of a diode group and a control circuit according to the third embodiment.

FIG. 19 is a timing diagram of a diode group and a control circuit according to the third embodiment. The timing diagram of FIG. 19 represents leakage currents IsubA to IsubD of the diode groups 42A to 42D, the output CA of the amplifier CAMP1, and the drive signals G1 to G4 of the comparators CMP1 to CMP4 when the input current Ifin that flows through the control circuit 43 increases or decreases as illustrated in FIG. 19 from time T0 to time T10. Moreover, in FIG. 19, it is assumed that a direction from the input terminal PZ2 to the input terminal PZ1 (the first rectification direction) is a positive direction of the input current Ifin.

At time T0, when the input current Ifin increases and flows in the first rectification direction (the positive direction), the potential difference between both terminals of the sense resistor RS increases. At the same time, the output CA of the amplifier CAMP1 rises from a reference voltage Vb=VOFF× Av that is a product of the offset voltage VOFF multiplied by the gain Av of the amplifier CAMP1.

As a result, the drive signals G1 to G4 respectively outputted by the comparators CMP1 to CMP4 all assume the H level. Accordingly, the PMOS transistors P1 to P4 of the diode groups 42A to 42D all enter the off-state. In other words, the size of the diodes of the diode groups 42A to 42D assumes the size of the diode D1.

In each of the diode groups 42B and 42C, the parasitic diodes DS1 enter an inversely-biased state when a current Ifin flows through the main diodes D1 and a leakage current Isub=Isub1 that is weak with respect to the input current Ifin is created. In other words, from time T0, the leakage current IsubB of the diode group 42B and the leakage current IsubC of the diode group 42C become Isub1.

At time T1, as the output CA of the amplifier CAMP1 reaches the reference voltage VREF1, the drive signal G1 outputted from the comparator CMP1 changes from the H level to the L level. Accordingly, the PMOS transistors P1 and P3 of the diode groups 42B and 42C are switched from the off-state to the on-state. In other words, the size of the diodes of the diode groups 42B and 42C is increased to a size (D1+D2) that combines the main diode D1 and the sub-diode D2.

In addition, in each of the diode groups 42B and 42C, the parasitic diodes DS1 and DS2 enter an inversely-biased state when a current Ifin flows through the main diodes D1 and the sub-diodes D2 and a leakage current Isub=Isub1+Isub2 that is weak with respect to the input current Ifin is created. In other words, from time T1, the leakage current IsubB of the diode group 42B and the leakage current IsubC of the diode group 42C become Isub1+Isub2.

At time T2, as the output CA of the amplifier CAMP1 reaches the reference voltage VREF2, the drive signal G2 outputted from the comparator CMP2 changes from the H level to the L level. Accordingly, the PMOS transistors P2 and P4 of the diode groups 42B and 42C are switched from the off-state to the on-state. In other words, the size of the diodes of the diode groups 42B and 42C is increased to a size (D1+D2+D3) that combines the main diode D1 and the sub-diodes D2 and D3.

In addition, in each of the diode groups 42B and 42C, the parasitic diodes DS1, DS2, and DS3 enter an inversely-biased state when a current Ifin flows through the main diodes D1 and the sub-diodes D2 and D3 and a leakage current Isub=Isub1+Isub2+Isub3 that is weak with respect to the input current Ifin is created. In other words, from time T2, the leakage current IsubB of the diode group 42B and the leakage current IsubC of the diode group 42C become Isub1+Isub2+Isub3.

The input current Ifin starts decreasing between time T2 and T3. At the same time, the potential difference between both terminals of the sense resistor RS decreases and the output CA1 of the amplifier CAMP1 drops.

Subsequently, as the output CA1 drops below the reference voltage VREF2 at time T3, the drive signal G2 outputted from the comparator CMP2 changes from the L level to the H level. Accordingly, the PMOS transistors P2 and P4 of the diode groups 42B and 42C are switched from the on-state to the off-state. In other words, the size of the diodes of the diode groups 42B and 42C is reduced to a size (D1+D2) that combines the main diode D1 and the sub-diode D2.

Accordingly, at the diode groups 42B and 42C, a leakage current Isub=Isub1+Isub2 that is weak with respect to the input current Ifin is created. In other words, from time T3, the leakage current IsubB of the diode group 42B and the leakage current IsubC of the diode group 42C become Isub1+Isub2.

At time T4, as the output CA1 of the amplifier CAMP1 drops below the reference voltage VREF1, the drive signal G1 outputted from the comparator CMP1 changes from the L level to the H level. Accordingly, the PMOS transistors P1 and P3 of the diode groups 42B and 42C are switched from the on-state to the off-state. In other words, the size of the diodes of the diode groups 42B and 42C is reduced to the size of the main diode D1.

Accordingly, at the diode groups 42B and 42C, a leakage current Isub=Isub1 that is weak with respect to the input current Ifin is created. In other words, from time T4, the leakage current IsubB of the diode group 42B and the leakage current IsubC of the diode group 42C become Isub1.

At time T5, as the input current Ifin starts to flow in the second rectification direction (negative direction), the potential difference between both terminals of the sense resistor RS further decreases in the negative direction and the output CA1 of the amplifier CAMP1 drops.

In addition, since a current does not flow through the diode groups 42B and 42C at this point, the leakage current IsubB of the diode group 42B and the leakage current IsubC of the diode group 42C both assume zero amperes (0 A).

On the other hand, since the drive signals G3 and G4 are maintained at the L level, the size of the diode groups 42A and 42D is the size of the main diode A. Therefore, in each of the diode groups 42A and 42D, the parasitic diodes DS1 enter an inversely-biased state when a current Ifin flows through the main diodes D1 and a leakage current Isub=Isub1 that is weak with respect to the input current Ifin is created. In other words, from time T5, the leakage current IsubA of the diode group 42A and the leakage current IsubD of the diode group 42D become Isub1.

At time T6, as the output CA1 of the amplifier CAMP1 drops below the reference voltage VREF3, the drive signal G3 outputted from the comparator CMP3 changes from the H level to the L level. As a result, the PMOS transistors P1 and P3 of the diode groups 42A and 42D are switched from the off-state to the on-state. In other words, the size of the diodes of the diode groups 42A and 42D is increased to a size (D1+D2) that combines the main diode D1 and the sub-diode D2.

Accordingly, in each of the diode groups 42A and 42D, the parasitic diodes DS1 and DS2 enter an inversely-biased state when a current Ifin flows through the main diodes D1 and the sub-diodes D2 and a leakage current Isub=Isub1+Isub2 that is weak with respect to the input current Ifin is created. In other words, from time T6, the leakage current IsubA of the diode group 42A and the leakage current IsubD of the diode group 42D become Isub1+Isub2.

At time T7, as the output CA1 of the amplifier CAMP1 drops below the reference voltage VREF4, the drive signal G4 outputted from the comparator CMP4 changes from the H level to the L level. As a result, the PMOS transistors P2 and P4 of the diode groups 42A and 42D are switched from the off-state to the on-state. In other words, the size of the diodes of the diode groups 42A and 42D is increased to a size (D1+D2+D3) that combines the main diode D1 and the sub-diodes D2 and D3.

Accordingly, in each of the diode groups 42A and 42D, the parasitic diodes DS1, DS2, and DS3 enter an inversely-biased state when a current Ifin flows through the main diodes D1 and the sub-diodes D2 and D3 and a leakage current Isub=Isub1+Isub2+Isub3 that is weak with respect to the input current Ifin is created. In other words, from time T7, the leakage current IsubA of the diode group 42A and the leakage current IsubD of the diode group 42D become Isub1+Isub2+Isub3.

The input current Ifin starts increasing between time T7 and T8. At the same time, the potential difference between both terminals of the sense resistor RS increases and the output CA1 of the amplifier CAMP1 rises.

Subsequently, as the output CA1 reaches the reference voltage VREF4 at time T8, the drive signal G4 outputted from the comparator CMP4 changes from the L level to the H level. Accordingly, the PMOS transistors P2 and P4 of the diode groups 42A and 42D are switched from the on-state to the off-state. In other words, the size of the diodes of the diode groups 42A and 42D is reduced to a size (D1+D2) that combines the main diode D1 and the sub-diode D2.

Accordingly, at the diode groups 42A and 42D, a leakage current Isub=Isub1+Isub2 that is weak with respect to the input current Ifin is created. In other words, from time T8, the leakage current IsubA of the diode group 42A and the leakage current IsubD of the diode group 42D become Isub1+Isub2.

As the output CA1 reaches the reference voltage VREF3 at time T9, the drive signal G3 outputted from the comparator CMP3 changes from the L level to the H level. Accordingly, the PMOS transistors P1 and P3 of the diode groups 42A and 42D are switched from the on-state to the off-state. In other words, the size of the diodes of the diode groups 42A and 42D is reduced to the size of the main diode D1.

Accordingly, at the diode groups 42A and 42D, a leakage current Isub=Isub1 that is weak with respect to the input current Ifin is created. In other words, from time T9, the leakage current IsubA of the diode group 42A and the leakage current IsubD of the diode group 42D become Isub1.

At time T10, as the input current Ifin assumes zero amperes (0 V), the potential difference between both terminals of the sense resistor RS and the output CA1 of the amplifier CAMP1 become zero volts (0 V). As a result, at the diode groups 42A and 42D, the leakage current Isub changes from Isub1 to zero amperes (0 A).

As described above, according to the third embodiment, the relatively small control circuit 43 including a single sense resistor RS, a single amplifier CAMP1, and four comparators CMP1 to CMP4 controls the size of the diodes of four diode groups 42A to 42D based on a magnitude and a direction of flow of an input current Ifin.

Specifically, when the input current Ifin is flowing in the first rectification direction, as the input current Ifin increases, the control circuit 43 increases the size of the diodes of the diode groups 42B and 42C that are on a path of the first rectification direction to allow a large input current Ifin to flow. In addition, as the input current Ifin decreases, the control circuit 43 reduces the size of the diodes of the diode groups 42B and 42C to reduce the leakage current Isub.

On the other hand, when the input current Ifin is flowing in the second rectification direction, as the input current Ifin increases, the control circuit 43 increases the size of the diodes of the diode groups 42A and 42D that are on a path of the second rectification direction to allow a large input current Ifin to flow. In addition, as the input current Ifin decreases, the control circuit 43 reduces the size of the diodes of the diode groups 42A and 42D to reduce the leakage current Isub.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A bridge rectifier circuit comprising:
   first, second, third, and fourth diode groups which are bridge-connected and each of which includes a main diode and a single or a plurality of sub-diodes that are enabled to be respectively connected in parallel to the main diode via a first switch and a second switch, which are provided between anodes of the main diode and the single or the plurality of sub-diodes and between cathodes of the main diode and the single or the plurality of sub-diodes respectively;
   first and second input terminals to which AC power from an AC power source is supplied;
   a first output terminal which is connected to the first input terminal via the first diode group and which is connected to the second input terminal via the second diode group;
   a second output terminal which is connected to the first input terminal via the third diode group and which is connected to the second input terminal via the fourth diode group; and
   a control circuit configured to detect a current flowing through at least one diode group from among the first, second, third, and fourth diode groups and to control, based on the detected current, the first switch and the second switch of the diode group, wherein
   the control circuit is configured to turn ON the first switch and the second switch so as to increase the number of the single or the plurality of sub-diodes connected in parallel to the main diode of the diode group in accordance with an increase in the detected current.

2. The bridge rectifier circuit according to claim 1, wherein the AC power is generated by energy harvesting.

3. The bridge rectifier circuit according to claim 1, wherein the control circuit is configured to turn OFF the first switch and the second switch so as to reduce the number of the single or the plurality of sub-diodes connected in parallel to the main diode of the diode group in accordance with a decrease in the detected current.

4. The bridge rectifier circuit according to claim 1, wherein the control circuit
   detects an input current that is inputted from the AC power source to the first or second input terminal,
   increases the number of the single or the plurality of sub-diodes connected in parallel to the main diode in each of the first and fourth diode groups as the detected input current increases, when the detected input current flows in a first rectification direction, and
   increases the number of the single or the plurality of sub-diodes connected in parallel to the main diode in each of the second and third diode groups as the detected input current increases, when the detected input current flows in a second rectification direction.

5. The bridge rectifier circuit according to claim 4, wherein the control circuit
   reduces the number of the single or the plurality of sub-diodes connected in parallel to the main diode in each of the first and fourth diode groups as the detected input current decreases, when the detected input current flows in the first rectification direction, and
   reduces the number of the single or the plurality of sub-diodes connected in parallel to the main diode in each of the second and third diode groups as the detected input current decreases, when the detected input current flows in the second rectification direction.

6. The bridge rectifier circuit according to claim 1, wherein the control circuit
detects a first current that flows through any one of the first and fourth diode groups and increases the number of the single or the plurality of sub-diodes connected in parallel to the main diode in each of the first and fourth diode groups as the first current increases, and
detects a second current that flows through any one of the second and third diode groups and increases the number of the single or the plurality of sub-diodes connected in parallel to the main diode in each of the second and third diode groups as the second current increases.

7. The bridge rectifier circuit according to claim 6, wherein the control circuit
reduces the number of the single or the plurality of sub-diodes connected in parallel to the main diode in each of the first and fourth diode groups as the first current decreases, and
reduces the number of the single or the plurality of sub-diodes connected in parallel to the main diode in each of the second and third diode groups as the second current decreases.

8. The bridge rectifier circuit according to claim 1, wherein the control circuit
detects currents respectively flowing through the first, second, third, and fourth diode groups,
increases the number of the single or the plurality of sub-diodes connected in parallel to the main diode of the first diode group as the current flowing through the first diode group increases,
increases the number of the single or the plurality of sub-diodes connected in parallel to the main diode of the second diode group as the current flowing through the second diode group increases,
increases the number of the single or the plurality of sub-diodes connected in parallel to the main diode of the third diode group as the current flowing through the third diode group increases, and
increases the number of the single or the plurality of sub-diodes connected in parallel to the main diode of the fourth diode group as the current flowing through the fourth diode group increases.

9. The bridge rectifier circuit according to claim 8, wherein the control circuit
reduces the number of the single or the plurality of sub-diodes connected in parallel to the main diode of the first diode group as the current flowing through the first diode group decreases,
reduces the number of the single or the plurality of sub-diodes connected in parallel to the main diode of the second diode group as the current flowing through the second diode group decreases,
reduces the number of the single or the plurality of sub-diodes connected in parallel to the main diode of the third diode group as the current flowing through the third diode group decreases, and
reduces the number of the single or the plurality of sub-diodes connected in parallel to the main diode of the fourth diode group as the current flowing through the fourth diode group decreases.

10. The bridge rectifier circuit according to claim 1, wherein
the main diode and the sub-diodes each include a second conductivity type well region formed in a first conductivity type semiconductor substrate, a first conductivity type anode region formed in the second conductivity type well region, and a second conductivity type cathode region formed in the second conductivity type well region.

11. The bridge rectifier circuit according to claim 10, wherein
the respective second conductivity type well regions of the main diode and the sub-diodes are formed separately from one another.

12. The bridge rectifier circuit according to claim 1, wherein
the detection of the current is performed in at least one diode group from among the first, second, third, and fourth diode groups based on a potential difference between both terminals of the diode group through which the current flows.

13. The bridge rectifier circuit according to claim 1, wherein
a resistor is connected to an input terminal of at least one diode group from among the first, second, third, and fourth diode groups,
the current is inputted to the diode group via the resistor, and
the detection of the current is performed based on a potential difference between both terminals of the resistor.

14. The bridge rectifier circuit according to claim 4, wherein
the detection of the input current is performed based on a potential difference between both terminals of a resistor which is provided between the first or second input terminal and the AC power source and through which the input current flows.

* * * * *